United States Patent
Driscoll et al.

(10) Patent No.: US 11,402,462 B2
(45) Date of Patent: Aug. 2, 2022

(54) INTELLIGENT SENSOR AND INTELLIGENT FEEDBACK-BASED DYNAMIC CONTROL OF A PARAMETER OF A FIELD OF REGARD TO WHICH THE SENSOR IS DIRECTED

(71) Applicant: Echodyne Corp., Kirkland, WA (US)

(72) Inventors: Tom Driscoll, Bellevue, WA (US); John Desmond Hunt, Seattle, WA (US); Robert Tilman Worl, Issaquah, WA (US); Muhammad Rameez Chatni, Redmond, WA (US); Aanand Esterberg, Seattle, WA (US); Kerem Karadayi, Seattle, WA (US); Christopher L. Lambrecht, Bothell, WA (US); Nathan Ingle Landy, Seattle, WA (US); Skyler Martens, Redmond, WA (US); Dominic Chun Kit Wu, Kirkland, WA (US)

(73) Assignee: Echodyne Corp., Kirkland, WA (US)

( * ) Notice: Subject to any disclaimer, the term of this patent is extended or adjusted under 35 U.S.C. 154(b) by 505 days.

(21) Appl. No.: 16/182,151

(22) Filed: Nov. 6, 2018

(65) Prior Publication Data
US 2019/0137601 A1 May 9, 2019

Related U.S. Application Data

(60) Provisional application No. 62/582,217, filed on Nov. 6, 2017.

(51) Int. Cl.
*G01S 7/03* (2006.01)
*G01S 13/931* (2020.01)
(Continued)

(52) U.S. Cl.
CPC ............... *G01S 7/03* (2013.01); *G01S 13/42* (2013.01); *G01S 13/931* (2013.01); *H01Q 1/3233* (2013.01)

(58) Field of Classification Search
CPC .......... G01S 7/03; G01S 13/42; G01S 13/931; H01Q 1/3233
See application file for complete search history.

(56) References Cited

U.S. PATENT DOCUMENTS

| 2,981,949 A | 4/1961 | Elliott |
| 3,987,454 A | 10/1976 | Epis |

(Continued)

FOREIGN PATENT DOCUMENTS

EP 1806598 A1 7/2007

OTHER PUBLICATIONS

International Bureau, "International Preliminary Report on Patentability from PCT Application No. PCT/US2018/059426", from Foreign Counterpart to U.S. Appl. No. 16/182,151, filed May 22, 2020, pp. 1 through 8, Published: WO.

(Continued)

*Primary Examiner* — Donald HB Braswell
(74) *Attorney, Agent, or Firm* — Fogg & Powers LLC

(57) ABSTRACT

An embodiment of a radar subsystem includes at least one antenna and a control circuit. The at least one antenna is configured to radiate at least one first transmit beam and to form at least one first receive beam. And the control circuit is configured to steer the at least one first transmit beam and the at least one first receive beam over a first field of regard during a first time period, and to steer the at least one first transmit beam and the at least one first receive beam over a second field of regard during a second time period.

26 Claims, 13 Drawing Sheets

C. Having stopped in the turn-out, measurement priority shifts to oncoming traffic at long-range (1) and in proximity (3), as well as high-resolution imaging of the barrier and turn vicinity (3). The intended lane is also checked for clearance (5). Some resources remain allocated to the previous lanes (4) to watch for possible rear-end events.

(51) Int. Cl.
*H01Q 1/32* (2006.01)
*G01S 13/42* (2006.01)

(56) References Cited

U.S. PATENT DOCUMENTS

| | | | |
|---|---|---|---|
| 4,870,424 | A | 9/1989 | Lalezari et al. |
| 5,736,907 | A | 4/1998 | Chen et al. |
| 5,781,157 | A | 7/1998 | Laird |
| 6,751,442 | B1 | 6/2004 | Barrett |
| 7,081,851 | B1 | 7/2006 | Lewis |
| 9,385,435 | B2 | 7/2016 | Bily et al. |
| 9,450,310 | B2 | 9/2016 | Bily et al. |
| 9,853,361 | B2 | 12/2017 | Chen et al. |
| 10,627,507 | B1 * | 4/2020 | Parker ............... H01Q 3/38 |
| 2005/0122255 | A1 | 6/2005 | Shmuel |
| 2006/0114155 | A1 | 6/2006 | Numminen et al. |
| 2006/0132374 | A1 | 6/2006 | Wang |
| 2008/0133812 | A1 * | 6/2008 | Kaiser ............... G06F 9/542 710/263 |
| 2011/0063158 | A1 | 3/2011 | Kondou et al. |
| 2012/0194399 | A1 | 8/2012 | Bily et al. |
| 2014/0266946 | A1 | 9/2014 | Bily et al. |
| 2015/0109178 | A1 | 4/2015 | Hyde et al. |
| 2015/0214615 | A1 | 7/2015 | Patel et al. |
| 2015/0288063 | A1 | 10/2015 | Johnson et al. |
| 2015/0318618 | A1 | 11/2015 | Chen et al. |
| 2016/0011307 | A1 | 1/2016 | Casse et al. |
| 2016/0061936 | A1 | 3/2016 | Schmalenberg et al. |
| 2016/0099500 | A1 | 4/2016 | Kundtz et al. |
| 2017/0300047 | A1 * | 10/2017 | Kolanek ............... F41G 7/306 |
| 2018/0026365 | A1 | 1/2018 | Driscoll et al. |
| 2018/0067488 | A1 * | 3/2018 | Pollach ............... G06N 20/00 |
| 2018/0067495 | A1 * | 3/2018 | Oder ............... G05D 1/0231 |
| 2018/0306905 | A1 * | 10/2018 | Kapusta ............... G01S 17/931 |
| 2019/0310347 | A1 * | 10/2019 | Harman ............... G01S 13/52 |

OTHER PUBLICATIONS

Huang et al, "Chapter 11, Design and Modeling of Microstrip Line to Substrate Integrated Waveguide Transitions", "Passive Microwave Components and Antennas", Apr. 1, 2010, pp. 1-24, "retrieved on Feb. 5, 2017 from: http://www.intechopen.com/books/passive-microwavecomponents-and-antennas/design-and-modeling-of-microstrip-line-to-substrate-integrated-waveguidetransitions", dated Apr. 1, 2010, pp. 225-246 and reference, Publisher: INTECH.
International Searching Authority, "International Search Report and Written Opinion from PCT Application No. PCT/US2018/059426", from Foreign Counterpart to U.S. Appl. No. 16/182,151, dated Dec. 16, 2019, pp. 1-12, Published: WO.
European Patent Office, "Communication pursuant to Article 94(3) from EP Application No. 18/909270.3", from Foreign Counterpart to U.S. Appl. No. 16/182,151, filed May 11, 2022, pp. 1 through 7, Published: EP.

\* cited by examiner

| | |
|---|---|
| Figs. 9A-9F Storyboard example of beam allocation during a U-turn maneuver, according to an embodiment. Overview of scenario. HAV starts at position (A), traveling along a divided highway, and desires to make an unprotected U-turn. It pulls into the turn-out (B), and comes to a stop (C). When oncoming traffic lanes are clear, it executes the U-turn (D) and merges back in to traffic headed the opposite direction (E). | FIG. 9A 900A<br>A: Driving on highway B: Slowing and entering turn-out 990<br>C: Waiting in turn-out (stopped) D: Executing U-turn E: Completed turn, speedup |
| A. Traveling down the highway, the HAV utilizes a set of beams as shown to the right. Those include long-range beams down highway (1), side/blind monitors (2,3), rear-facing (5,6) and broad-area measurement (4). | FIG. 9B 900B<br>A: Driving on highway<br>994A 994B 994E 994D 994C 992<br>Desirements:<br>1. Down highway, lane-ID with good Doppler<br>2. Immediate vicinity car spatial (some Doppler)<br>3. Highway-edge spatial registration,<br>4. Highway-lane spatial registration (Mott's dots)<br>5. Blind-spot monitoring<br>6. Rear-watch |
| B. Approaching and entering the turn out, measurement emphasis is shifted to the turn-out region (3), utilizing set(s) of beams to interrogate with high fidelity. Responsibilities for measuring the highway are not yet fully removed, and those persist (1,2,4). | FIG. 9C 900C<br>B: Slowing and entering turn-out 990<br>Desirements:<br>1. Lane keep-clear: (in case change mind): down highway<br>2. Lane keep-clear: behind and blind-spots<br>3. Spatial resolution fast update of the turnout (debris, registration, etc)<br>4. Rear check, long-range (rear-end risk) |

FIG. 9D

C. Waiting in turn-out (stopped)

Desirements:
1. Oncoming traffic: open-lane (lane-ID)
2. Turn-obstacles spatial (barriers, etc).
3. Turn-region spatial (debris)
4. Rear check, long-range (rear-end risk)
5. New-lane check (Long-range)

C. Having stopped in the turn-out, measurement priority shifts to oncoming traffic at long-range (1) and in proximity (3), as well as high-resolution imaging of the barrier and turn vicinity (3). The intended lane is also checked for clearance (5). Some resources remain allocated to the previous lanes (4) to watch for possible rear-end events.

FIG. 9E

Desirements:
1. Oncoming traffic: open-lane-ID
2. Target-lane check (long-range)
Anti-swerver oncoming (mid-range)
Spatial registration highway-edge and barrier
turn-region clearance (short-range)

D. During turn execution, the majority of resources are used to measure and confirm clearance in the oncoming traffic lanes at all ranges and in both directions.

FIG. 9F

Desirements:
1. New-lane clearance (lane-ID with good Doppler
2. Rear-collision continued watch
3. Immediate vicinity spatial
4. Highway registration (edges/barriers/dots)
5. Blind-spot monitoring E. Having completed the turn, and merged back into traffic, the HAV returns to a configuration similar to scenario A (but heading the opposite direction).

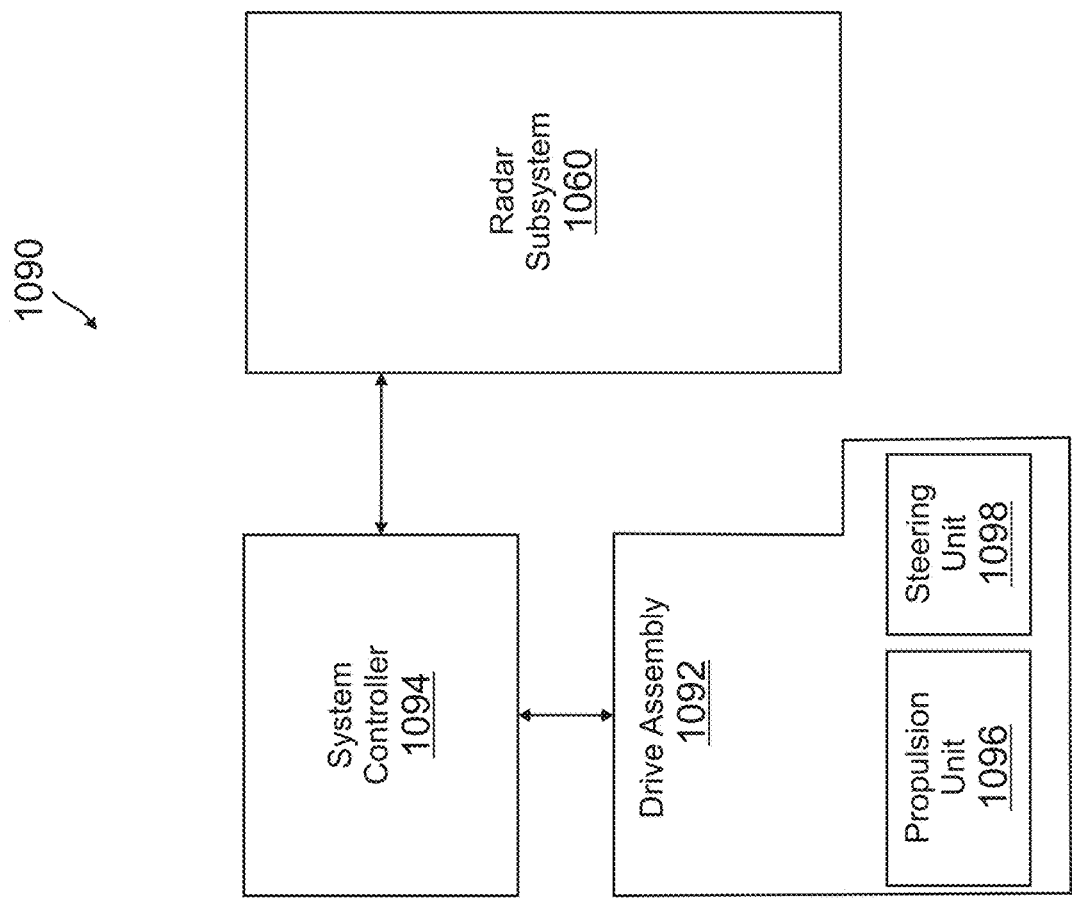

INTELLIGENT SENSOR AND INTELLIGENT FEEDBACK-BASED DYNAMIC CONTROL OF A PARAMETER OF A FIELD OF REGARD TO WHICH THE SENSOR IS DIRECTED

REFERENCE TO RELATED APPLICATION

This application claims the benefit of U.S. Provisional Patent Application Ser. No. 62/582,217, filed on Nov. 6, 2017, which provisional application is hereby incorporated herein by reference in its entirety.

SUMMARY

Glossary

Gain-pattern: Directivity and gain of one antenna or array across all angle space, consisting of traits including (but not necessarily limited to) direction in Azimuth (AZ) and Elevation (EL), Beam-width in AZ EL, Side Lobes in AA EL, and efficiency).

Range Doppler-manifold: The range-and-Doppler-measurements space made by one waveform with one sequence-of-processing chain, including a set of unambiguous ranges and unambiguous Doppler velocities, and range resolution(s) and Doppler resolution(s) therein.

Beam: An instantaneous gain-pattern, combined with an instantaneous RD-manifold (waveform and processing).

Field of regard (FOR): The total angular space on which the sensor makes intentional measurements, typically expressed in AZ and EL angles. A single field of regard need not be contiguous, nor monotonic.

Field of View (FOV): The total angular space on which the sensor is capable of making intentional measurements. FOV is also known as the maximum field of regard.

The idea of intelligently tasked sensors is fundamental, and incredibly powerful. Even in sensor-tech spaces where one might suspect that such approaches are already being pursued (for example electronically scanned lidars), there is little indication that such approaches actually are being pursued. Sensors are an integral part of an enormous and diverse number of systems, and span an enormous number of different sensing modalities. Recently, sensors have become high-priority considerations for autonomous vehicles and aircraft, where common sensor modalities include cameras, lidars, ultra-sonics, and radars.

The task for any sensor is to make measurements of aspects of the real-world using one or more sensing resources, and to return data that represents ground-truth (e.g., actual velocity of a sensed object, actual range of a sensed object) as closely as possible. Some examples of the resources that sensors use to make measurements are the number of pixels for an image-capture device such as a camera, the number of beams for a lidar, and the receiving digitizer rate for an ultrasonic sensor.

In the case of autonomous vehicles, the measurement of primary interest is a three-dimensional (3D) representation of the surrounding environment including obstacles/objects (collectively "items"), plus the velocities (e.g., relative to the earth frame of reference or relative to the vehicle) at which the items are moving; the combination of the 3D representation and the item velocities is, effectively, a four-dimensional (4D) data-cube.

In many cases, the resources utilized for sensing are subject to some limits, and one or more of those resource limitations place bounds on the measurement capabilities in one or more bases. For example, the number of pixels in a camera bounds the resolution of which it is capable, and the bit-depth of the pixels bounds the contrast ratio of which it is capable.

The bounds on the measurement can negatively impact a sensor's ability to operate in an environment, and can have severe ramifications on utility. For example, a camera sensor that suffers from insufficient resolution due to a limited number of pixels may be entirely unable to detect objects that are relatively small or relatively far away. Similarly, a camera sensor with limited bit-depth may experience complete blindness when saturated with direct sunlight or glare.

In the case of a radar-based sensor, a critical resource is the radar's time-bandwidth-product (TBP), which is, effectively, equal to the total bandwidth of all of the radar's receiver channels. The TBP limits the speed (or rate) at which a radar can acquire information about the respective ranges and respective velocities of objects, and at which it can determine the objects' respective angular bearings in azimuth and elevation.

Given the goal of designing a radar system capable of making high-resolution measurements of the world in three dimensions plus velocity, a logical approach would be to maximize the TBP for the purpose of minimizing ultimate limitations on the measurement.

Unfortunately, receiver channels with large bandwidth are more difficult and costly to manufacture, and a higher number of channels drives up system cost and complexity, both directly and indirectly, through the required processing and support subsystems. Thus, a radar with a high TBP becomes costly, and has increased size, weight, and power consumption (together referred to by the acronym C-SWAP).

Other resources in a radar sensor are also subject to constraints that may impact the overall system measurement capabilities, such constraints including computational constraints, data-bandwidth constraints, and energy (power) constraints. These resources also may be driven by the total TBP.

The radar designer is thus faced with making a compromise between the desire to make high-performance measurements of the ground-truth and meeting the C-SWAP constraints imposed by the target application/market.

In the commercial application space for autonomous (land, air, and sea) vehicles, this compromise is especially uncomfortable given the simultaneous need for high-performance measurement to support autonomy and low cost, size, weight, and power to enable commercial-market penetration.

Therefore, there is a need for a sensor, a sensor subsystem, and a sensor system, that has enhanced performance while satisfying C-SWAP constraints.

Disclosed herein are embodiments that include a new class of sensor that has improved performance relative to resource constraints by, for example, intelligently morphing the aspect-ratio of its data cube. And such a sensor may also dynamically morph the aspect-ratio of its data cube.

To enhance sensor performance while maintaining C-SWAP constraints, an embodiment of an intelligent sensor includes a capability to dynamically allocate constrained resources across the measurement space of interest in response to a variety of feedback inputs, and can operate according to methods by which those resources are prioritized and distributed.

In another embodiment, where the intelligent sensor is a radar sensor including one or more transmit antennas and one or more receive antennas, the radar sensor can dynamically reconfigure a gain-pattern of each transmit and/or receive antenna. The gain-pattern may be controlled, e.g. with software, to affect parameters such as azimuth pointing angle(s), elevation pointing angle(s), beam width(s) in azimuth and elevation, side-lobe levels in azimuth and elevation, realized gain, and power transmitted. Such gain patterns can be arranged sequentially such that the combination of sequentially arranged gain patterns offers a combined total field of regard. For example, using such a radar sensor, a radar operator or controller system, e.g. implemented with circuitry, thus can configure the radar field of regard in azimuth and elevation to include or exclude particular regions of the field of view. Similarly, using such a radar sensor, a radar operator or controller system can configure the resolution in azimuth and in elevation by control over the beam widths utilized to make up that field of regard.

In another embodiment, a radar sensor includes a capability to generate a transmit signal whose parameters are a function of time (a waveform) and are generated by a signal generator (e.g. that is software controlled), and includes the ability to reconfigure, e.g. via software, the signal parameters such as amplitude, frequency, and phase. The radar sensor also includes a radar receiver and a processing system, e.g. implemented with circuitry, and the ability to reconfigure, e.g. via software, parameters of the processing system. The radar operator can thus configure the sensor's Range-Doppler manifold to include or exclude ranges and velocities of particular interest, and can configure the range and Doppler resolutions over the Range-Doppler manifold.

In another embodiment in which the above two embodiments are combined, a radar sensor includes both the ability to reconfigure, e.g. via software, components of the gain-pattern of the transmit and/or receive antennas, such as directivity, beam-width, and side-lobes, and the ability to reconfigure, e.g. via software, the transmit-signal parameters such as amplitude, frequency, and phase, and the receiver processing. The radar operator or controller system, e.g. implemented with circuitry, thus can configure the system field of regard to include or exclude particular azimuth and elevation fields of regard, ranges, and velocities of interest, thus forming a 4D hypervolume of interest. Furthermore, the radar operator or controller system can configure the azimuth, elevation, range, and velocity resolution(s) within that hypervolume of interest, including configuring distinct resolutions configured over one or more sub-hypervolumes.

Another embodiment of a radar subsystem includes at least one antenna and a control circuit. The at least one antenna is configured to radiate at least one first transmit beam and to form at least one first receive beam. And the control circuit is configured to steer the at least one first transmit beam and the at least one first receive beam over a first field of regard during a first time period, and to steer the at least one first transmit beam and the at least one first receive beam over a second field of regard during a second time period.

Using a radar sensor that includes one or more of the above-described embodiments, a radar operator or controller system can allocate, intelligently, the constrained resources of the radar sensor to meet the needs of different platforms, engagements, and environments, and can perform this allocation dynamically in real-time and in response to changing conditions. That is, such a system can include one or more sensor feedback loops that allow the radar operator or controller system to reconfigure the radar sensor in response to information that the sensors obtain and provide to the system.

The aforementioned techniques illustrated for a radar sensor may be utilized with other sensors, such as, for example, sonic and lidar sensors. A radar system of subsystem can use various sources of data and/or information to direct this intelligence, including data which comes directly from the radar sensor, data which comes from other sensors such as cameras and lidars, and data which comes from preexisting information such as maps.

An intelligent radar system or subsystem can allocate resources more efficiently in order to avoid the wasting of resources by, for example, measuring empty areas/regions such as sky or vacant fields. That is, an intelligent radar system or subsystem can be used to allocate resources more efficiently by not wasting resources on sensing in regions of lower priority, such as off-road regions for an autonomous car.

An intelligent radar system or subsystem can contain a firewall (a "blocked-off" region of the field of regard) and can avoid regions of known or detected interference or degraded measurement, such as regions of strong clutter.

An intelligent radar system or subsystem can prioritize objects or regions in a field of view, to increase measurement resolution (in angular, range, and/or Doppler domains), to increase the update rate on objects, or to increase the measurement range or Doppler extent on certain areas/regions (e.g. tracking long-range radar down a freeway).

Given the latency and communication overhead to/from any sensor, a radar operator or controller circuit may have (at least effectively) concerns associated with requirements for controlling such an intelligent sensor. However, the radar operator or controller circuit may also be able to re-allocate the radar resources very quickly, to respond to emergency situations or to rapidly changing environments. The designer of an intelligent sensor is thus motivated to minimize the communication and control overhead, while simultaneously improving the responsiveness (in terms of response time and situational flexibility). One embodiment that simultaneously accomplishes both of these objectives is the use of internal control that is free-running on the sensor side, but that accepts and responds quickly to prioritized adjustments to that tasking from an external control source.

BRIEF DESCRIPTION OF THE DRAWINGS

Understanding that the drawings depict only exemplary embodiments and are not, therefore, to be considered limiting in scope, exemplary embodiments are described with additional specificity and detail through the use of the accompanying drawings, in which:

FIG. 8 is an example scenario, which storyboards—in a coarse treatment—the different FORs that might be of interest, and beams within those FORs, according to an embodiment.

FIGS. 9A-9F illustrate a time sequence of radar-beam allocation during a maneuver of an autonomous vehicle, according to an embodiment.

FIG. 11 is a block diagram of a system that includes the radar subsystem of FIG. 10, according to an embodiment.

DETAILED DESCRIPTION

Figure 1:
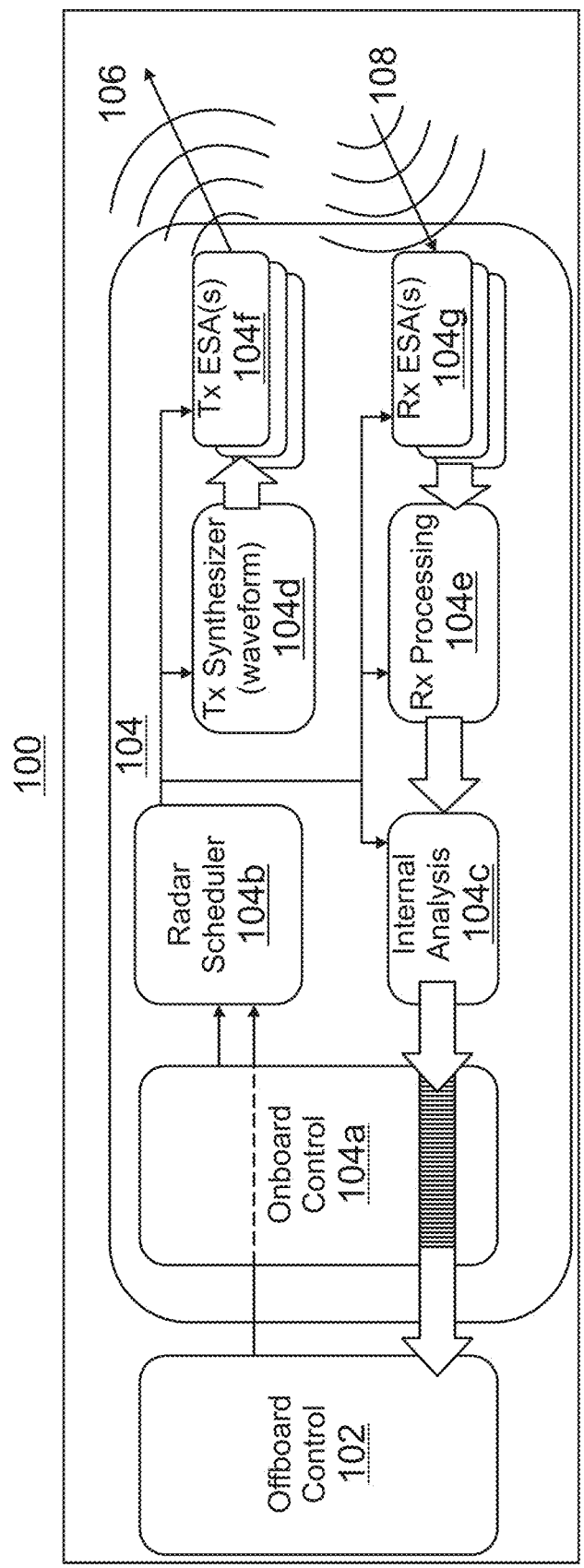
FIG. 1 is a depiction of a dynamically taskable radar sensor that provides for software-defined configuration of subsystems including transmit antenna(s), receive antenna(s), waveform synthesizers, and receiver processing circuitry, according to an embodiment.

In the following detailed description, reference is made to the accompanying drawings that form a part hereof, and in which is shown by way of illustration specific illustrative embodiments. However, it is to be understood that other embodiments may be utilized, and that structural, mechanical, and electrical changes may be made. Furthermore, the methods presented in the drawing figures and the specification are not to be construed as limiting the order in which the individual steps may be performed. The following detailed description is, therefore, not to be taken in a limiting sense.

Also, certain terms are defined in the above Glossary. Furthermore, embodiments of the invention are applicable to a broad range of sensors, e.g. including sonic sensors, ultrasonic sensors, and lidar sensors. However, for pedagogical reasons, the sensors may be described as radar sensors, it being understood that the description of a radar system may apply to one or more other types of sensors.

One or more of the components described below can be formed from electronic circuitry that is hardwired to perform the described functions, and/or from software or firmware that configures one or more electronic circuits to perform the described functions.

FIG. 1 is a diagram of a radar system 100, which includes an offboard controller 102 coupled to a radar subsystem 104, according to an embodiment. The offboard controller 102 may also be referred to as offboard control. The radar subsystem 104 includes an onboard controller (onboard control) 104a, a radar-beam scheduler (RBS or radar scheduler) 104b, an internal analyzer 104c, a transmit synthesizer (Tx synthesizer (waveform)) 104d, a receiver processor (Rx processing) 104e, at least one electronic-steering-array transmit antenna (Tx ESA(s)) 104f, and at least one ESA receive antenna (Rx ESA(s)) 104g. The radar-beam scheduler 104b is configured to control the transmit synthesizer 104d to generate respective waveforms at respective times, and to control the at least one electronic-steering-array (ESA) transmit antenna 104f to radiate a sequence of at least one transmit beam 106 in response to the waveforms. That is, the at least one ESA transmit antenna 104f is configured to convert control signals and waveforms from the transmit synthesizer 104d and the radar-beam scheduler 104b into respective transmit beam(s). Similarly, the radar-beam scheduler 104b is configured to control at least one ESA receive antenna 104g to generate a sequence of at least one receive beam 108, and to control a receiver processor 104e to process signals received via the at least one receive beam 108. An internal analyzer 104c is configured to analyze the processed received signals and to provide, to the onboard controller 104a and the offboard controller 102, information regarding objects and other items in a field of regard formed by the one or more waveforms generated by the at least one ESA transmit antenna 104f and the at least one ESA receive antenna 104g. The onboard controller 104a and offboard controller 102 are configured, in response to the information from the internal analyzer 104c, to alter the operation of the radar-beam scheduler 104b. For example, if the radar subsystem 104 is onboard an autonomous car, and the internal analyzer 104c detects a bicyclist within a field of regard of the at least one ESA transmit antenna 104f and the at least one ESA receive antenna 104g, then the onboard controller 104a and/or the offboard controller 102 may command the radar-beam scheduler 104b to cause the at least one ESA transmit antenna 104f and the at least one ESA receive antenna 104g to generate transmit and receive beams 106 and 108, respectively, that track the movement of the bicyclist relative to the car for the purpose of preventing the car from colliding with the bicyclist.

Figure 2:
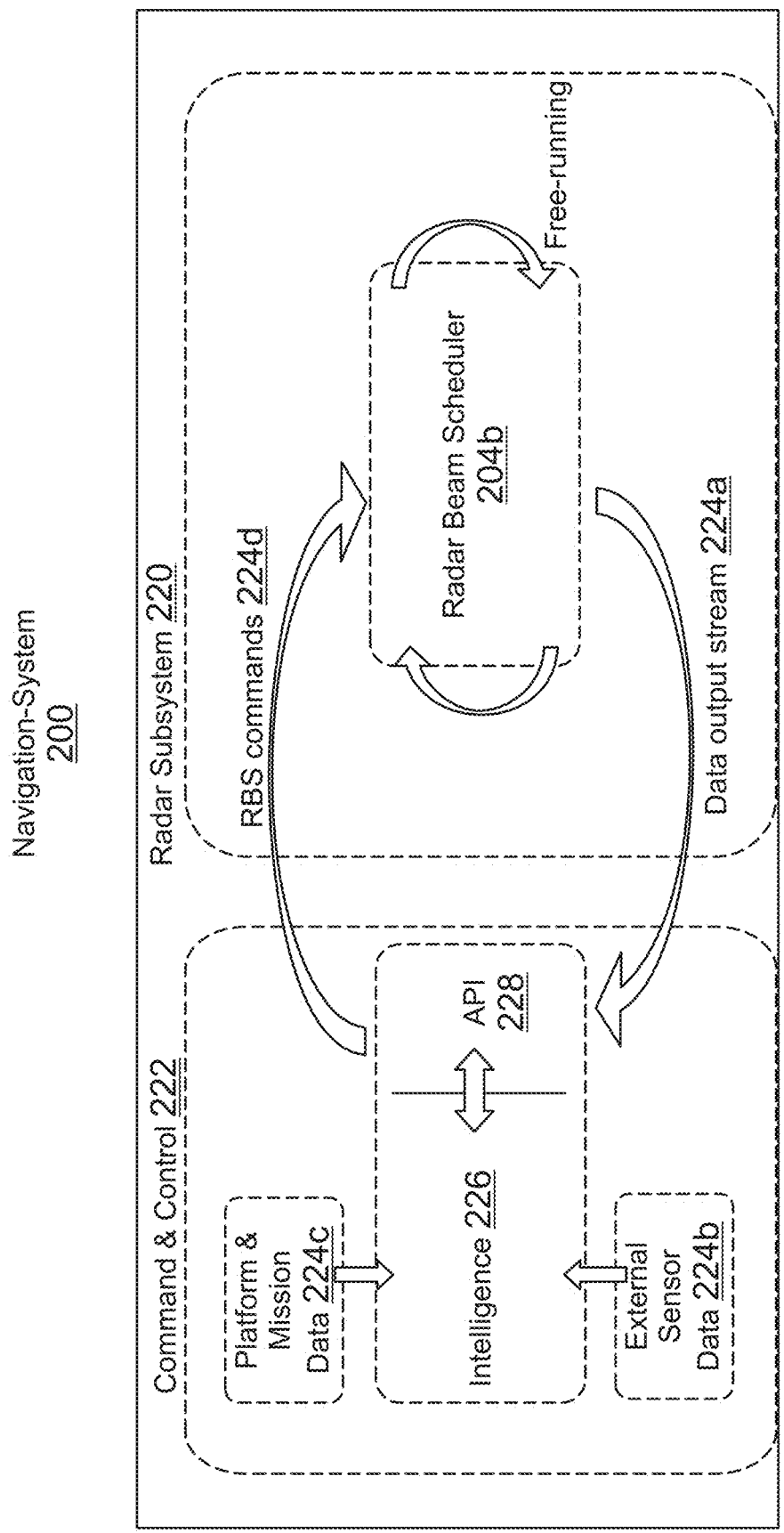
FIG. 2 is a depiction of the control and feedback cycle between a taskable sensor capable of independent free-running operation and a master control system, according to an embodiment.

FIG. 2 is a diagram of a navigation-system 200, and corresponding data flow, according to an embodiment. The illustrated embodiment of the navigation-system 200 enables tasking of a dynamic radar utilizing a radar-beam scheduler 204b. The navigation-system 200 includes a radar subsystem 220 coupled to a command-and-control subsystem 222. For example, the radar subsystem 220 may be similar to the radar subsystem 104 of FIG. 2, and the command-and-control subsystem 222 may include the offboard controller 102 of FIG. 1.

The radar subsystem 220 includes the radar-beam scheduler 204b, which can be configured to operate in an autonomous, free-running mode in which it causes the at least one ESA transmit antenna 104f and the at least one ESA receive antenna 104g (e.g. as described herein with respect to FIG. 1) to generate transmit and receive beams 106 and 108, respectively, according to a predetermined time sequence. The radar-beam scheduler 204b is configured to analyze information from the receive beams 108 and to provide this information, in the form of a data output stream 224a, to a command-and-control subsystem 222.

The command-and-control subsystem 222 is configured to analyze mission data 224c (e.g., a destination of an autonomous vehicle such as a self-driving car that incorporates the navigation system 200), the radar data from the data output stream 224a, and data from other sensors 224b (e.g., lidar, ultrasound, optical/camera), using intelligence or algorithms 226 such as artificial intelligence. In response to this analysis, the command-and-control subsystem 222, through the intelligence 226, controls operation of the radar subsystem 220 to affect the mission by issuing radar-beam scheduler (RBS) commands 224d to affect beam steering of the radar sub-system 220. Data is conveyed between the radar-beam scheduler 204b and the command-and-control subsystem 222 through an applications program interface 228 of the intelligence 224 in the command-and control subsystem 224.

For example, if the data output stream 224a indicates that the radar subsystem 220 detected a bicyclist ahead of a vehicle that includes the navigation system 200, then the command-and-control subsystem 220 may issue one or more commands to the radar subsystem 204b to focus transmit and receive radar beams 106 and 108 (FIG. 1), respectively, on the bicyclist so that the command-and-control subsystem 222 can track the location and trajectory of the bicyclist (the subsystem 222 can track the location and trajectory in an absolute sense relative to a frame of reference occupied by both the bicyclist and the vehicle, or the subsystem can tract the location and trajectory relative to the vehicle), and can navigate the vehicle to avoid a collision with the bicyclist, particularly if the bicyclist makes a sudden move into a collision course with the vehicle.

Figure 3A:
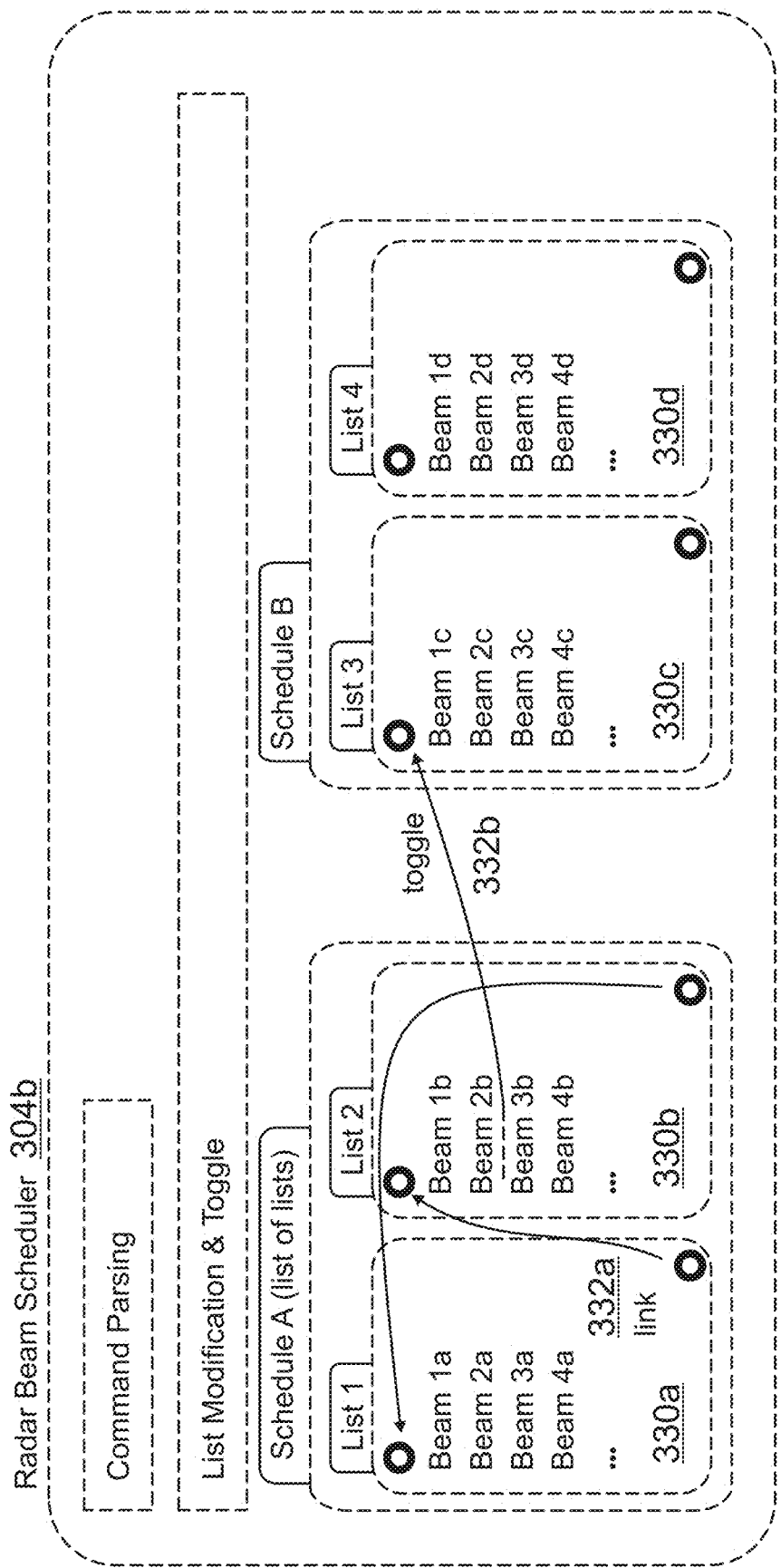
FIG. 3A is a depiction of a nested-list-based approach for scheduling radar beams, according to an embodiment.

FIG. 3A is a logical diagram of operation of a radar-beam scheduler 304b, according to an embodiment. For example, the radar-beam schedule 304b may be similar to the radar-beam schedule 104 of FIG. 1 or the radar-beam schedule 204

In an embodiment, nested loops of beam lists 330a, 330b, 330c, 330d are used. Each list 330a, 330b, 330c, 330d contains a sequence of beams, where each beam can have one or more different characteristics such as power, phase, width, direction, and beam-steering pattern. Lists 330a, 330b, 330c, 330d can be nested using connections. The connections can occur due to a link or linkage 332a according to a plan, or can be initiated by circuitry external to the radar-beam schedule 304b, based upon external conditions using an interrupt, a "goto" command, or a toggle command (toggle) 332b. For example, an external circuit can cause the radar-beam schedule 304b to transition from Schedule A of the lists 330a and 330b, which schedule "look at" a large FOR, to Schedule B of the lists 330c and 330d, which schedule may focus on a smaller FOR due to, for example, detection of a bicyclist in the smaller FOR.

When two or more beam lists are linked together, as is shown for List 1 330a and List 2 330b, upon completing List 1 330a (e.g. radiating a beam according to Beam 4a), List 2 330b is commenced. Upon completion of List 2 330b, (e.g. radiating a beam according to Beam 4b), List 1 30b is recommenced. In other embodiments, more than two beam lists can be linked together such that the radar-beam scheduler 304b causes the at least one ESA transmit antenna 104f (FIG. 1) to radiate, sequentially, each beam in Beam List 1, Beam List 2, . . . and Beam List n. Upon radiating the last beam in Beam List n, the radar-beam scheduler 304b causes the at least one ESA transmit antenna 104f to repeat the sequence by radiating the first beam in Beam List 1. Each set of linked beam lists may each be referred to as a schedule, e.g. Schedule A, Schedule B, . . . .

The radar-beam scheduler 304b includes (e.g., is configured to implement) the beam lists 330a, 330b, 330c, 330d. The radar-beam scheduler 304b is configured to control the at least one ESA transmit antenna 104f and the at least one ESA receive antenna 104g (e.g. as described herein with respect to FIG. 1) to generate respective transmit and receive beams in sequences according to beam lists 330a, 330b, 330c, 330d. For example, assume that the beam lists 1-4 330a, 330b, 330c, 330d in FIG. 3 are for transmit beams. Further assume, for example, that initially the radar-beam scheduler 304b causes the at least one ESA transmit antenna 104f to radiate four transmit beams 106 sequentially in a repeating order represented by List 1. Then, at a first time corresponding to a programmed time or upon satisfaction of a condition an event, a linkage 332a causes the radar-beam scheduler 304b to "jump" or transition from List 1 to a List 2, and thus causes the at least one ESA transmit antenna 104 to radiate four transmit beams sequentially in a repeating order represented by List 2. Then, at a second time corresponding to a programmed time, a toggle command 332b causes the radar-beam scheduler 304b to "jump" or transition from List 2 to Lists 3 and 4, and thus causes the at least one ESA transmit antenna 104 to radiate eight transmit beams sequentially in a repeating order represented by Lists 3 and 4. The radar-beam scheduler 304b causes the at least one ESA transmit antenna 104 to radiate a transmit beam 108 that sequentially changes in a loop according to the Lists 3 and 4 until commanded to stop by the command-and-control subsystem 222 (e.g. a described with respect to FIG. 2). Although each of List 1-List 4 is described as including four respective beams, one or more of the lists can include more or fewer than four beams, and the lists need not all include a same number of beams. For example, Beam 1 in List 1 need not be the same as (e.g., need not have the same characteristics as) Beam 1 in List 2.

And in another example, a link 332c may cause the radar-beam schedule 304b to transition from List 2 to List 1 after the next time the ESA transmit antenna generates beam 4b after the transition command (e.g., interrupt) or condition (e.g., detect item such as a bicyclist) occurs.

Figure 3B:
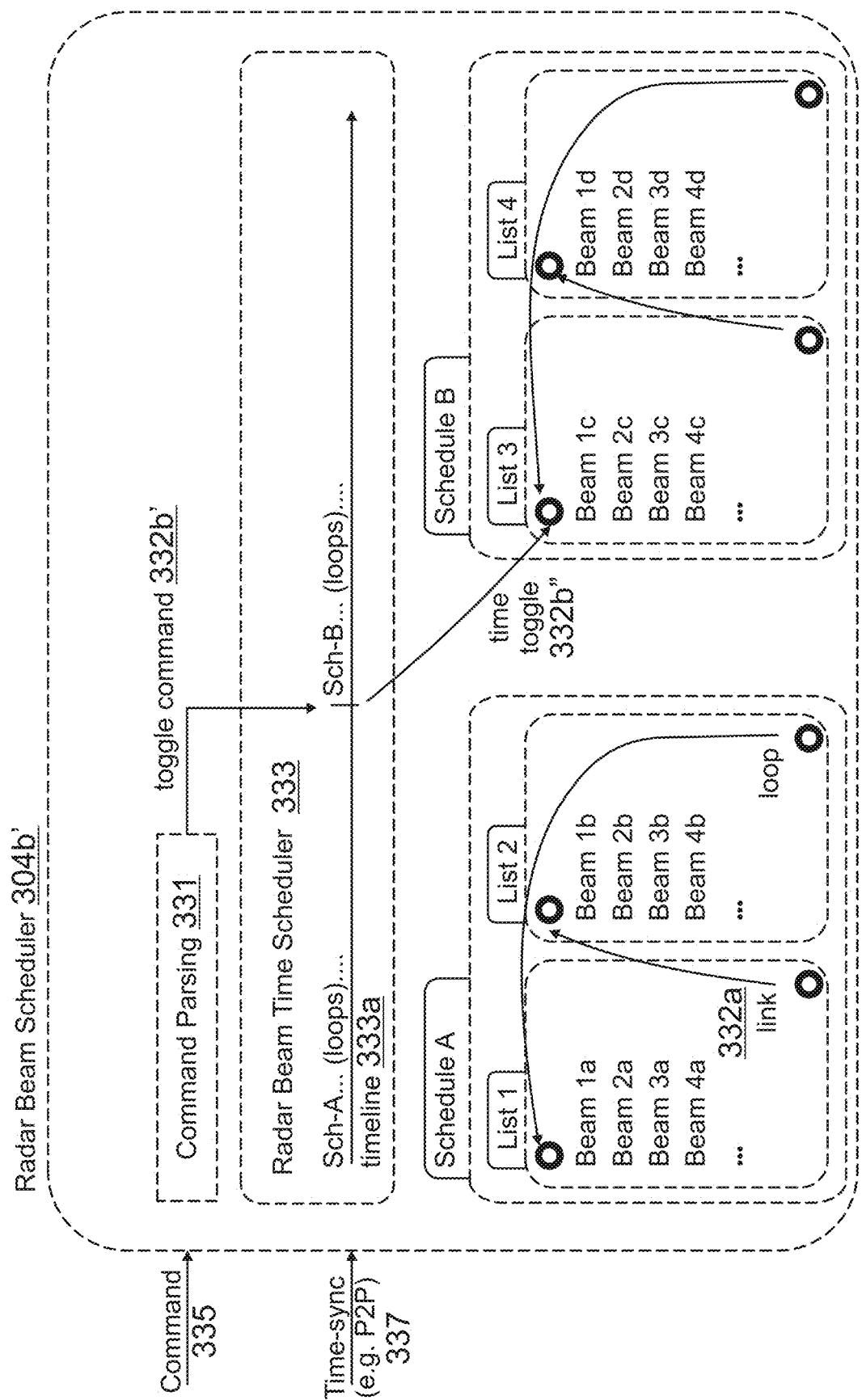
FIG. 3B is a depiction of a nested-list-based approach for scheduling radar beams, the approach including time-synch and time-scheduling of toggle events, according to an embodiment.

FIG. 3B is a logical diagram of operation of a radar-beam scheduler 304b', according to another embodiment. The described embodiment also uses nested loops. However, in the described embodiment, a toggle command 332b' is initiated at a predefined time. The radar-beam scheduler 304b' includes a command-parsing subsystem (command parsing) 331 and a radar-beam time scheduler 333. The radar-beam scheduler 304b' and the command-parsing subsystem 331 are configured to receive external commands 335 from the command-and-control subsystem 222 (FIG. 2). One example of such a command 335 is a command to cause the radar-beam scheduler 304b' to transition from one beam schedule to another beam schedule at a specific, time or date.

The command-parsing subsystem 331 is also configured to control other components of the radar-beam scheduler 304b'. The radar-beam time scheduler 333 is configured to generate a time line 333a of when to change schedules. The radar-beam scheduler 304b' and the radar-beam time scheduler 333 are configured to receive a time signal (time-sync) 337 from other components of the radar system 104 (FIG. 1), or from one or more external systems other than the radar system 104, for example, through the offboard controller 102. The external system(s) providing the time signal 337 may be other radar systems coupled to the radar-beam schedule 304b' through a peer-to-peer network (P2P) or a network-time-protocol server or cluster of servers. Upon receiving a command 335 instructing to change schedules at a certain, time or date, the command parsing system 331 causes the radar-beam time scheduler 333 to modify the time line so that upon occurrence of the time or date, the radar-beam time scheduler 333 is configured to cause the radar-beam scheduler 304b' to perform a time toggle 332b" from one schedule to another schedule (e.g., from Schedule A to Schedule B or vice-versa).

The radar-beam scheduler 304b' is configured to control the at least one ESA transmit antenna 104f and the at least one ESA receive antenna 104g (e.g. as described in FIG. 1) to generate respective transmit and receive beams in ordered sequences according to beam lists. For example, assume that the beam Lists 1-4 in FIG. 3B are for transmit beams. In an example, the radar-beam scheduler 304b' causes the at least one ESA transmit antenna 104f to radiate four transmit beams sequentially in an order represented by List 1. Then, at the end of List 1, the radar-beam scheduler 304b' "jumps" to a List 2, and causes the at least one ESA transmit antenna 104f to radiate four transmit beams sequentially in an order represented by List 2. Next, at the end of List 2, the radar-beam scheduler 304b' "jumps" back to the beginning or top (beam 1a) of List 1. Therefore, the radar-beam scheduler 304b' executes Schedule A by looping through List 1 and List 2 indefinitely. In response to a toggle command 332b', the radar-beam scheduler 304b' causes the at least one ESA transmit antenna 104f effectively to "jump" to a List 3, and to radiate four transmit beams sequentially in an order represented by List 3. Then, at the end of List 3, the radar-beam scheduler 304b' "jumps" to a List 4 and causes the at least one ESA transmit antenna 104f to radiate four transmit beams sequentially in an order represented by List 4. Next, at the end of List 4, the radar-beam scheduler "jumps" back to the beginning or top (beam 1c) of List 3. Therefore, the radar-beam scheduler 304b' executes Schedule B by looping through List 3 and List 4 indefinitely until, for example, the radar-beam scheduler 304b' receives a command 335 to stop from a command-and-control subsystem (e.g. as illustrated in FIG. 2). Although each of List 1-List 4 is described as including four respective beams, one or more of the lists can include more or fewer than four beams, and the lists need not all include a same number of beams. For example, Beam 1 in List 1 need not be the same as Beam 1 in List 2.

Referring to FIGS. 3A-3B, each list can include, or have associated therewith, properties for each beam in the list, and a control circuit can change these properties dynamically, that is, "on the fly," at any time without restarting or otherwise affecting the execution of the list or of any other lists. Examples of list properties include the focus center of a beam, the focus angle of a beam, the half-power width of a beam, the power of a beam, the polarization of the beam, the phase of a beam, the order in which the control circuit generates the beams, the durations of the beams, and the steering patterns for the beams. Each beam in a list can have the same list properties as the other beams in the list, can have some same and some different list properties compared to the other beams in the list, or can have all different list properties as compared to the other beams in the list. Further, a control circuit can implement a change in one or more list properties in response to any suitable toggle event, such as a branch, conditional, or jump (e.g., "goto") instruction in a program that the control circuit is executing, an external (e.g., hardware) or software interrupt, a timed toggle, a "doorbell," a detection of an object in a field of regard, a change in speed or direction of a vehicle, the time of day, etc. In an embodiment, such a change in one or more list properties can take effect as soon as the generation of a next beam after the change has been made, or at any time thereafter. That is, the control circuitry can control the beam-steering behavior of the beams asynchronously.

Figure 4:
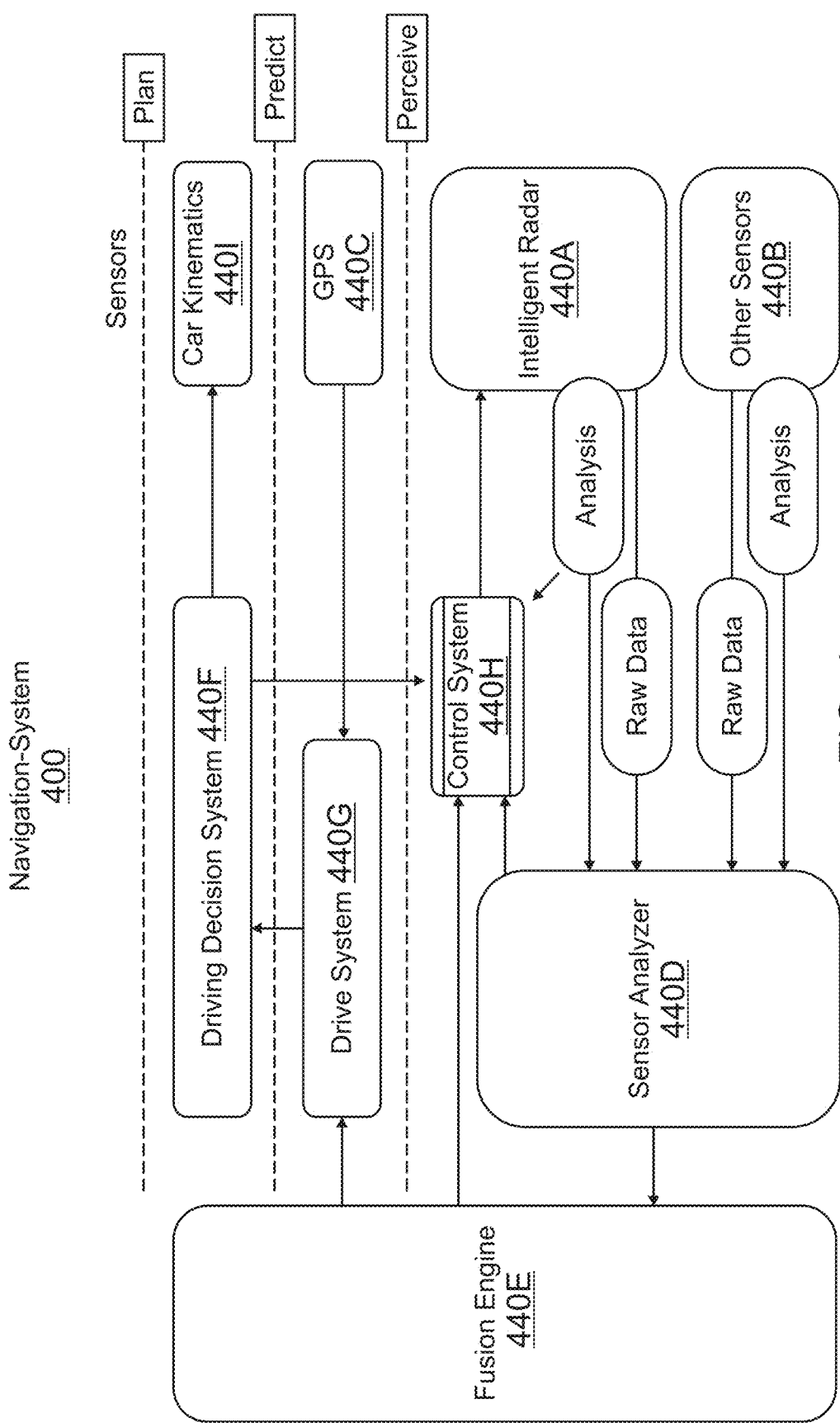
FIG. 4 is a depiction of the integration of a dynamically taskable radar subsystem into a control system for a highly autonomous vehicle, according to an embodiment.

FIG. 4 is a diagram of a navigation-system 400 for an autonomous automobile or other autonomous vehicle, and of a corresponding data and process flow, according to an embodiment. The navigation system 400, which may be similar to the navigation system 200 of FIG. 2, includes an intelligent radar subsystem 440A, other sensors (or sensor subsystems) 440B, a global navigation satellite system (GNSS) receiver (GPS) 440C, a sensor analyzer 440D, a fusion engine 440E, a driving-decision system 440F, a state estimation/extrapolation and drive system (drive system) 440G, a control system 440H, and a car kinematics system (car kinematics) 440I. One or more of the aforementioned components of the navigation system 400 may be implemented wholly or partially by electronic circuitry.

Car kinematics system 440I is a system in the vehicle that is configured to control the motion (e.g., steering, velocity, and direction) of the vehicle. The driving-decision system 440F is configured to control car kinematics of, for example, an autonomous (self-driving) automobile according to programmed instructions, such as instructions for the vehicle to drive to a programmed destination via a programmed route.

Electronic and optical sensors, including the global navigation satellite system receiver 440C, the intelligent radar 440A, other sensors 440B (e.g. camera(s), lidar(s), and ultrasonic sensor(s)), are configured to gather and to provide information regarding the environment in which the autonomous automobile is operating. For example, the global navigation satellite system receiver (GPS) 440C is configured to provide an instantaneous location of the automobile. The intelligent radar 440A is configured to provide locations, types, and velocities of objects (e.g., other vehicles, pedestrians, bicyclists, curbs, barriers, traffic islands, traffic signals, and traffic signs) within a programmed range (e.g., 150 meters) from the vehicle, and may be implemented as described with respect to FIGS. 1-3B. The other sensors (440B), e.g. lidar sensor(s) and/or camera(s), are configured to provide instantaneous ranges of detected objects and a cross-range image. Each of the intelligent radar 440A and the other sensors 440B may include an analysis capability that provides analysis information derived from the data measured by the corresponding sensor(s). For example, the analysis information may indicate a pedestrian crossing the street 500 feet in front of the vehicle, and the analysis capability may include the capability to control the vehicle (e.g., to cause the vehicle to slow and eventually stop) to avoid colliding with the pedestrian.

The sensor analyzer 440D, which can be separate and independent from the different sensors, is configured to analyze sensor data (raw sensor data and any analysis information) provided by the intelligent radar 440A and the other sensors 440B. The sensor analyzer 440D is configured to distill the sensor data into higher-level information, (e.g., to identify a car as a distinct object on a road, to determine a detected sign as a stop sign, to determine a detected traffic signal as displaying a red light). In the case of the intelligent radar 440A, the analysis information coming from those sources can be used to control/reconfigure the radar, e.g. by control signal(s) based upon information from the fusion engine 440E, the sensor analyzer 440D, or the intelligent radar 440A; for example, the control system 440H may be configured to received analysis information from the intelligent radar 440A. The control system 440H is configured to receive data from not only the intelligent radar 440A, but also from the sensor analyzer 440D, the fusion engine 440E, and/or the driving decision system 440F. The control system 440H is configured to modify the operation of the intelligent radar 440A based upon such received information, e.g. as described below.

For example, if the sensor analyzer 440D detects and identifies a pedestrian at a street corner, the sensor analyzer can command the intelligent radar 440A to focus resources on the pedestrian in an effort to insure that the navigation system 400 is provided with a stream of information about the pedestrian (e.g., location, direction and velocity of movement) sufficient to allow the navigation system to prevent the vehicle from striking the pedestrian. In this way, the intelligent sensors (e.g. the intelligent radar 440A and the other sensors 440B) and the sensor analyzer 440D form an inner, or local, feedback loop.

The fusion engine 440E is configured to receive sensor-analysis information from the sensor analyzer 440D, which information is based upon a combination of information from multiple sources, e.g. sensors. The fusion engine 440E is configured to generate information provided to the state estimation/extrapolation and drive system 400G, to control kinematics of the vehicle. For example, the fusion engine 440E is configured to effectively combine information from the sensor analyzer 440D, and from one or more external sources (e.g., weather data from a weather computer server, traffic information from a traffic compute server), and, in response to the combined information, the fusion engine is configured to provide corresponding control information to the control system 440H. For example, if the sensor analyzer 440D provides information indicative of a bicyclist in the road, and an external source provides information of icy road conditions, then the fusion engine 440E is configured to combine this information and to cause the control system 440H to slow the vehicle down more than the control system otherwise might based only on the information regarding the bicyclist. And the drive system 440G is configured to receive automobile position data from the GNSS GPS receiver 440C.

The driving decision system 440F is configured to provide autonomous control of the automobile based upon analysis information (e.g., based upon information intelligent radar 440 and the other sensors 440B) provided by the drive system 440G. For example, if sensor-analysis information reveals a large gathering of pedestrians on a street corner, such as may occur during a political protest or at an event such as a concert, the driving-decision system 440F may command the car to take an alternate route for the purpose of avoiding the pedestrian-crowded intersection. The control center 440H may then command the operations of the radar 440A in accordance with the route change. For example, the control system 440H may cause the radar to stop focusing on the crowd of pedestrians and to direct focus to the roadway in front of the autonomous automobile as the automobile turns a corner on the new route it will follow. In this way, the fusion engine 440E, state estimation of the drive system 440G, the driving-decision system 440F, the control system 440H, the radar 440A, and the sensor analyzer 440D form an outer, or global, feedback loop through the control system that includes at least part of the inner/local feedback loop.

Figure 5:
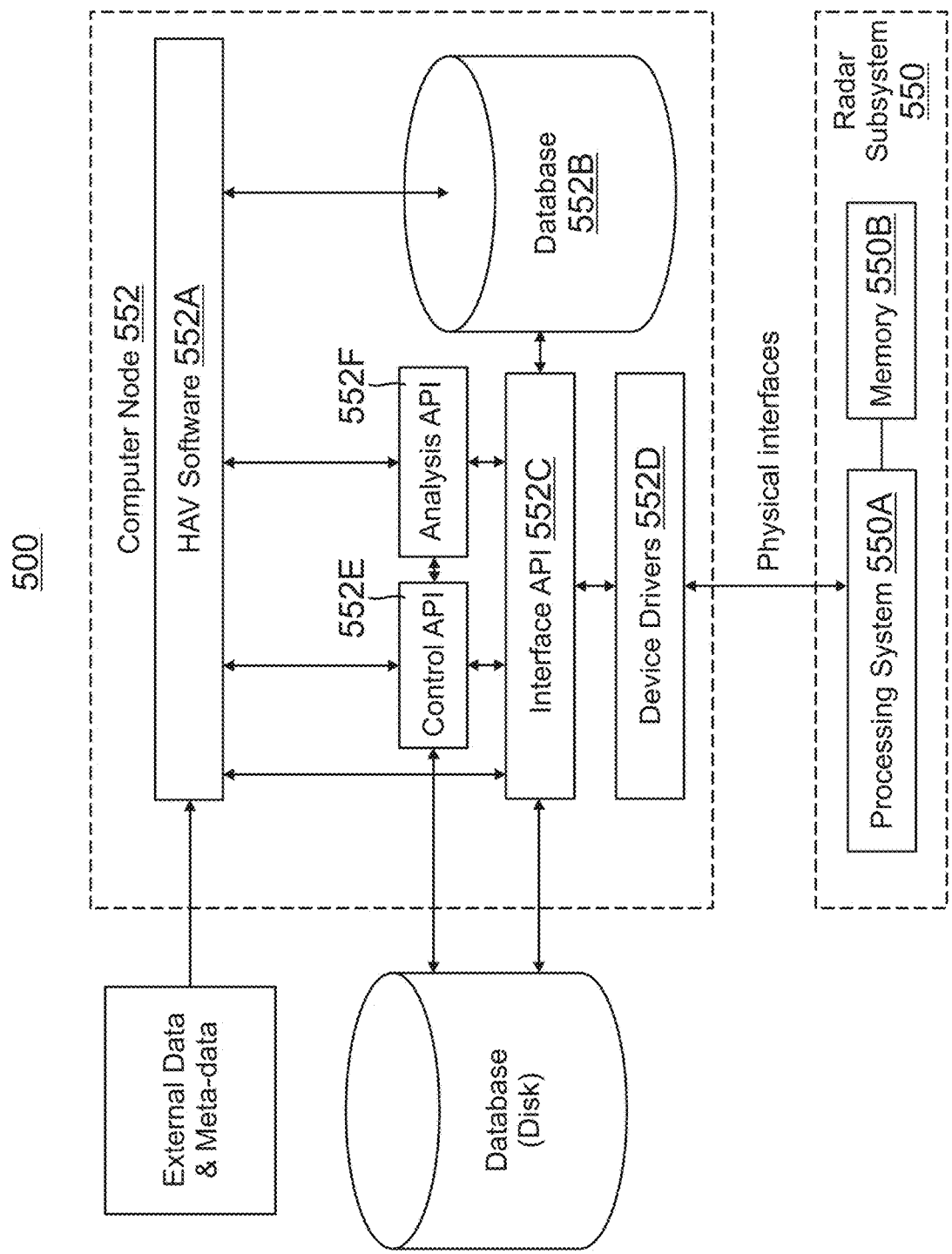
FIG. 5 is a depiction of a system and circuitry configured for intelligent allocation of resources across angular fields of regard and respective RD manifolds, within a scene of interest, according to an embodiment. Angular regions of disinterest or distraction can be excluded entirely from interrogation. Regions that produce interfering clutter can be identified and contained. Regions or objects of top importance can be interrogated with additional resources, such as higher angular resolution, higher Doppler or range resolution, longer range, etc.

FIG. 5 is a diagram of hardware, software, and other components of a navigation system 500, according to an embodiment in which the navigation system 500 is configured to form part of a system such as an autonomous automobile. The navigation system 500 include a radar subsystem 550 and a computer node (e.g., computing circuitry) 552. For example, the navigation system 500 may be similar to one or both of the navigation subsystems 200 and 400 of FIGS. 2 and 4, respectively.

The radar subsystem includes a processing system, e.g. circuitry such as system on a chip (SoC) or a field-programmable gate array (FPGA) coupled to a memory (e.g., memory circuitry such as volatile memory such as random-access memory (RAM) or non-volatile memory such as electrically erasable and programmable memory (EEPROM, FLASH)) configured to store software/firmware/configuration data for configuring the SoC or FPGA. The radar subsystem 550 may include other components as described elsewhere herein.

The computer node 552 includes a memory (e.g., memory circuitry like volatile memory such as random-access memory (RAM) or non-volatile memory such as electrically erasable and programmable memory (EEPROM, FLASH)) coupled to a processor, e.g. processing circuitry such at least one central processing unit, digital signal processing unit, graphics processing unit, application specific integrated circuit, field-programmable gate array, microprocessor, or microcontroller. The memory is configured to store software or firmware including Highly Autonomous Vehicle (HAV) (referring to level 3 or greater on the NHTSA scale of 0 to 5) software 552A, device-drivers 552B, at least one application program interface (API) and a database 552B. The at least one API may include an interface API 552C, a control API, and an analysis API. The processing circuitry is configured to execute such software and/or firmware.

The computer node 552 also includes circuitry configured to implement software for control and analysis of the radar unit, which can be configured to perform multiple layers of abstraction. For example, multiple tiered layers of abstraction in the control software could creation of a "freeway measurement mode," which includes circuitry/software to "define long-range beam cluster," which includes circuitry/software to "define multiple beams with long range, and forward-facing angles." The computer node also includes circuitry configured to implement device drivers and interfaces and to execute software such as the HAV software. Additionally, external to, or part of, the radar subsystem and computer node are one or more memory devices (e.g., magnetic or solid-state disk(s)) configured to store data such as automobile-mission data.

Figure 6:
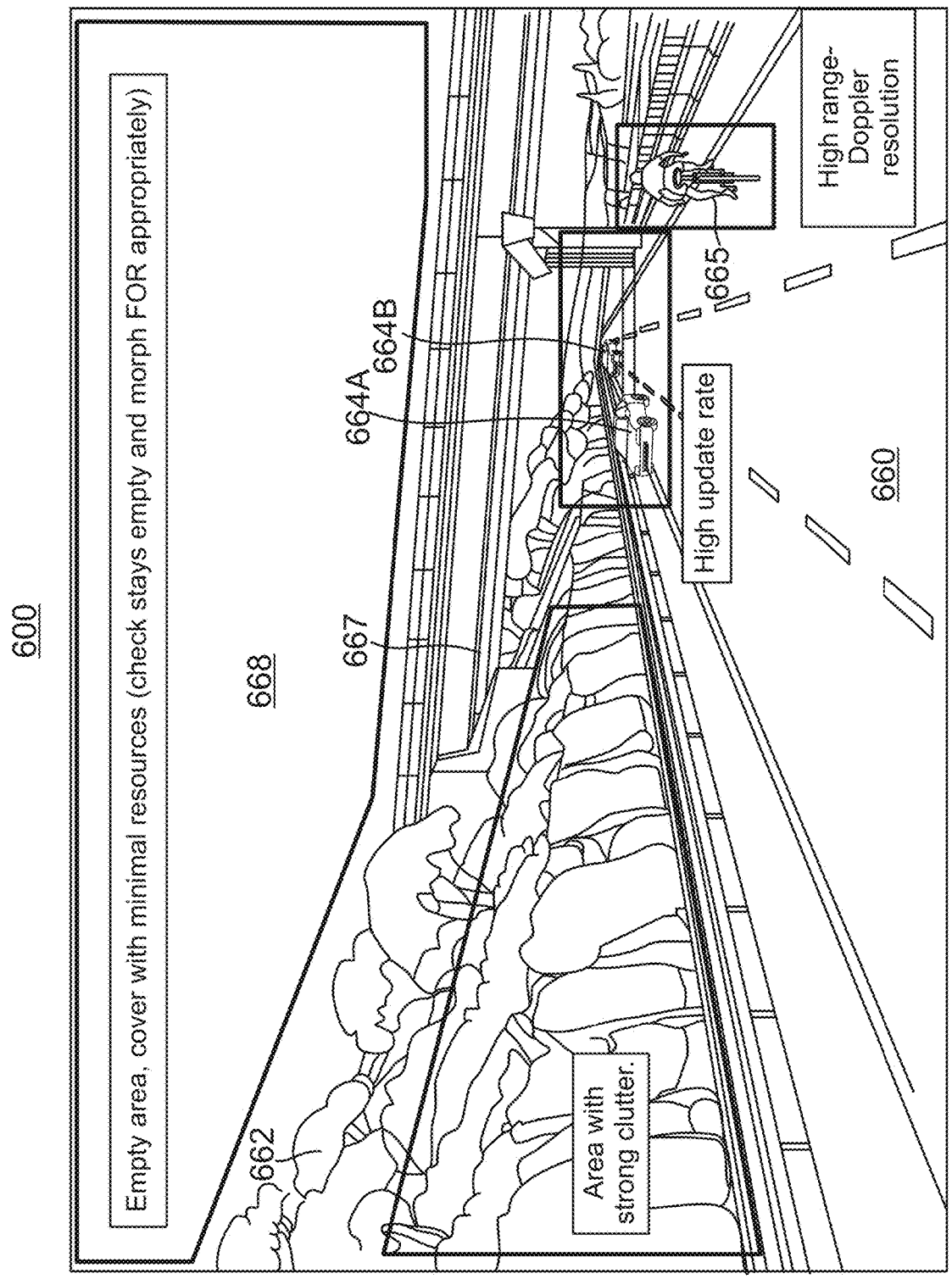
FIG. 6 is a depiction of allocation of resources within a range-Doppler manifold containing a scene of interest, according to an embodiment.

FIG. 6 is a diagram of an example environment 600, which an autonomous automobile may encounter and which is in the intelligent radar subsystem's field of view (FOV), and illustrates examples of how a sensor control subsystem of the automobile can segment, dynamically, an intelligent radar subsystem's field of view of the environment into one or more fields of regard (FOR) within the FOV, according to an embodiment in which the radar subsystem may impart respective detection and measurement parameters to each FOR. The environment 600 within the radar subsystem's FOV may include a roadway 660, stationary (relative to the earth's frame of reference) landscape objects 662 (e.g. rocks, trees, shrubs, hillsides) off to the sides of the roadway, other vehicle(s), e.g. another auto 664A and a bicyclist 664B moving along the roadway in the same direction as the self-driving automobile, an overpass 667, and the sky 668. The intelligent radar subsystem (for example, as described above in conjunction with FIGS. 1-5) is configured to generate, for each of these items/regions, a respective FOR with detection and measurement parameters that correspond to the item toward which the intelligent radar subsystem directs the FOR.

For example, the intelligent radar subsystem may be configured to "realize" that the sky, and stationary landscape objects off to the sides of the roadway, are relatively unimportant objects within the intelligent radar subsystem's FOV. Therefore, the intelligent radar subsystem can be configured to characterize such stationary landscape objects off to the side of the roadway, and the sky, as "clutter" that the radar subsystem monitors with a low priority. That is, the intelligent radar subsystem can be configured to define one or more FORs that each include a respective clutter region of the radar subsystem's FOV, and to allocate only a relatively small portion of the intelligent radar subsystem's bandwidth to these clutter FORs. For example, the radar subsystem may be configured to generate transmit beams and to analyze receive beams in these clutter FORs relatively infrequently (e.g., once every 100 milliseconds), and may be configured to reduce beam resolution in these clutter FORs. If the radar subsystem detects a change (e.g., a landslide or rocks that extend onto the roadway) in one of these FORs, than it can reconfigure, dynamically, the one FOR so as to devote more resources (e.g., more frequent transmit and analysis, and beams of higher resolution) to that FOR for the purpose of providing information to the navigation subsystem sufficient for the navigation subsystem to "decide" whether to reroute the automobile to avoid a potential collision.

Further in example, the intelligent radar subsystem may be configured to allocate a significant portion of its resources (e.g., bandwidth) to an FOR directed toward the overpass 667 until the intelligent radar subsystem can confirm that the height of the overpass is sufficient to allow safe passage of the autonomous automobile under the overpass, and thereafter the radar subsystem can allocate only a small portion of the intelligent radar subsystem's bandwidth to the overpass FOR. If the intelligent radar subsystem later detects a change (e.g., a falling or thrown object) in the overpass FOR, then it can reconfigure, dynamically, the overpass FOR so as to devote more resources to that FOR for the purpose of providing information to the navigation subsystem sufficient for the navigation subsystem to "decide" whether to reroute the vehicle to avoid a potential collision.

Still further in example, the intelligent radar subsystem may be configured to allocate a significant portion of its resources to a roadway FOR directed toward the roadway in front of the autonomous automobile, at least as long as there is another vehicle within the roadway FOR or while the roadway 660 ahead is curving. For example, the intelligent radar subsystem can make, within the roadway FOR, relatively frequent measurements of location and velocity of the other vehicle(s) 664A and 664B. A roadway FOR including other auto(s) 664A and 664B can be scanned with a higher update rate then other FORs. In response to the roadway FOR including no other vehicle for a predetermined period of time (e.g., ten seconds) due to, for example, the autonomous automobile overtaking and passing the other vehicles 664A and 664B, the intelligent radar system can reconfigure, dynamically, the roadway FOR to have a lower update rate or a lower resolution. If the radar subsystem later detects a vehicle 664A or 664B entering, or in, the roadway FOR, then the intelligent radar subsystem can reconfigure, dynamically, the roadway FOR so as to devote more resources to that FOR for the purpose of providing information to the navigation subsystem sufficient for the navigation subsystem to maintain the autonomous automobile at a safe distance from the other vehicle or vehicles 664A and 664B.

Yet further in example, the radar subsystem may be configured to allocate a significant portion of its resources to a FOR directed toward a detected object, e.g., a bicyclist 665 in, or alongside, the roadway 660A, for at least as long as the object is within the radar subsystem's field of view. For example, in response to the roadway FOR detecting a bicyclist 665, the radar system can generate, dynamically, a FOR within, or separate from, the roadway FOR, the generated FOR being dedicated to the bicyclist 665, and can allocate significant resources for the purpose of providing information sufficient for the analysis or fusion engines (e.g., FIG. 4) to classify the object as a bicycle, and to the navigation subsystem (e.g., FIG. 2, FIG. 4) sufficient for the navigation subsystem to maintain the autonomous automobile at a safe distance from the bicyclist 665. While the autonomous vehicle overtakes and passes the bicyclist 665, the radar subsystem can be configured to allocate resources to follow/track the bicyclist 665, e.g. to generate a higher-range Doppler resolution, and once the bicyclist has been safely passed, halt generation of the dedicated FOR to free those resources for other tasks.

Figure 7:
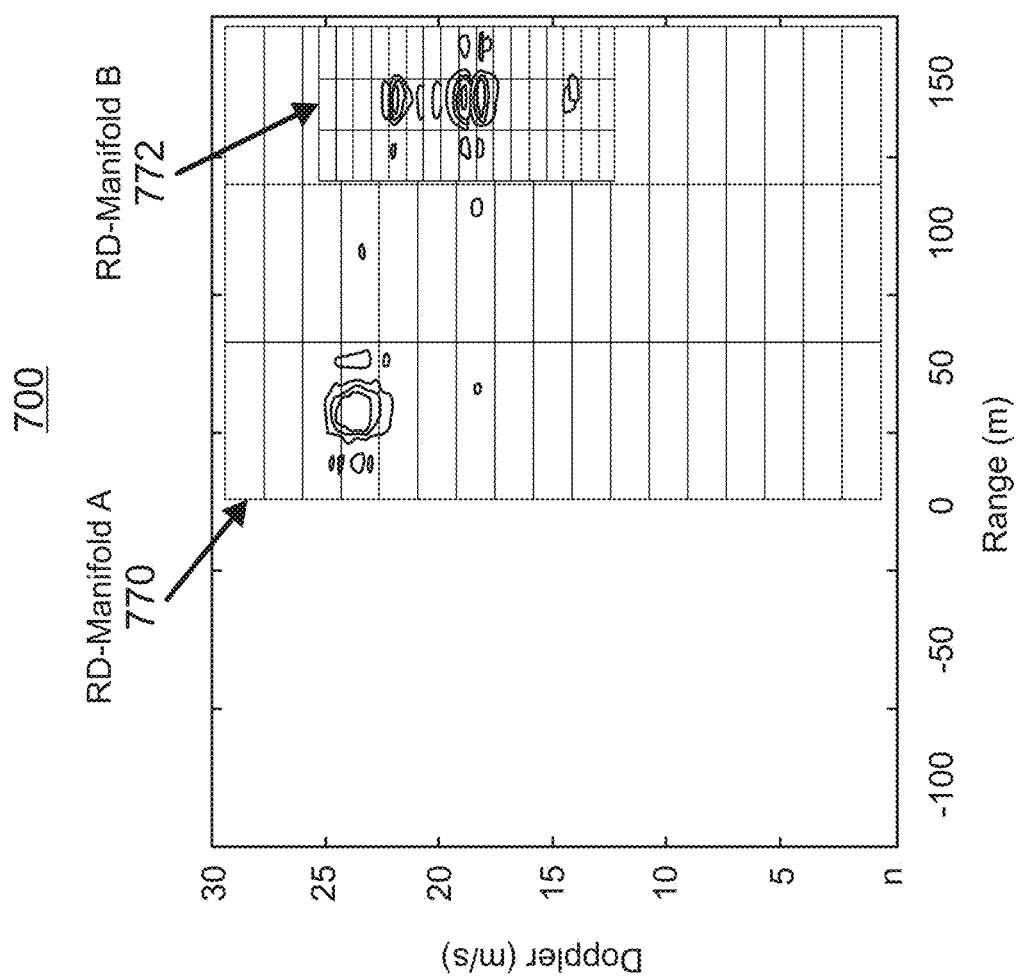
FIG. 7 is a depiction of range-Doppler Manifolds A and B, according to an embodiment. Manifold A depicts range and Doppler extents that cover a large extent with coarse resolution, whereas Manifold B depicts those same resources as covering a constrained extent with finer resolution, according to an embodiment.

FIG. 7 is a diagram of two overlapping Range-Doppler (RD) manifolds 700, according to an embodiment. For example, each manifold may correspond to a respective FOR generated by the intelligent radar subsystem. RD-Manifold A 770 covers a distance (between an item and the radar) range of 0-150 meters (m), and a velocity (of the item) range of 0-30 meters per second (m/s). RD-Manifold B 772, which is within Manifold A 770 in a re-allocated configuration of waveform and processing, and which can be generated using the same resources as RD-Manifold A 770, covers a distance range of 100-150 m and a velocity range of 10-25 m/s. The resolution of RD-Manifold A 770: between ~50 m and ~2 m/s is lower than the resolution of RD-Manifold B 770: between ~15 m and ~1 m/s. For example, RD-Manifold A 770 may correspond to a roadway FOR, and RD-Manifold B 772 may correspond to a dedicated FOR within the roadway FOR, where the dedicated FOR is focused on another vehicle or other item (e.g., a bicyclist) that is within the roadway FOR.

Figure 8:
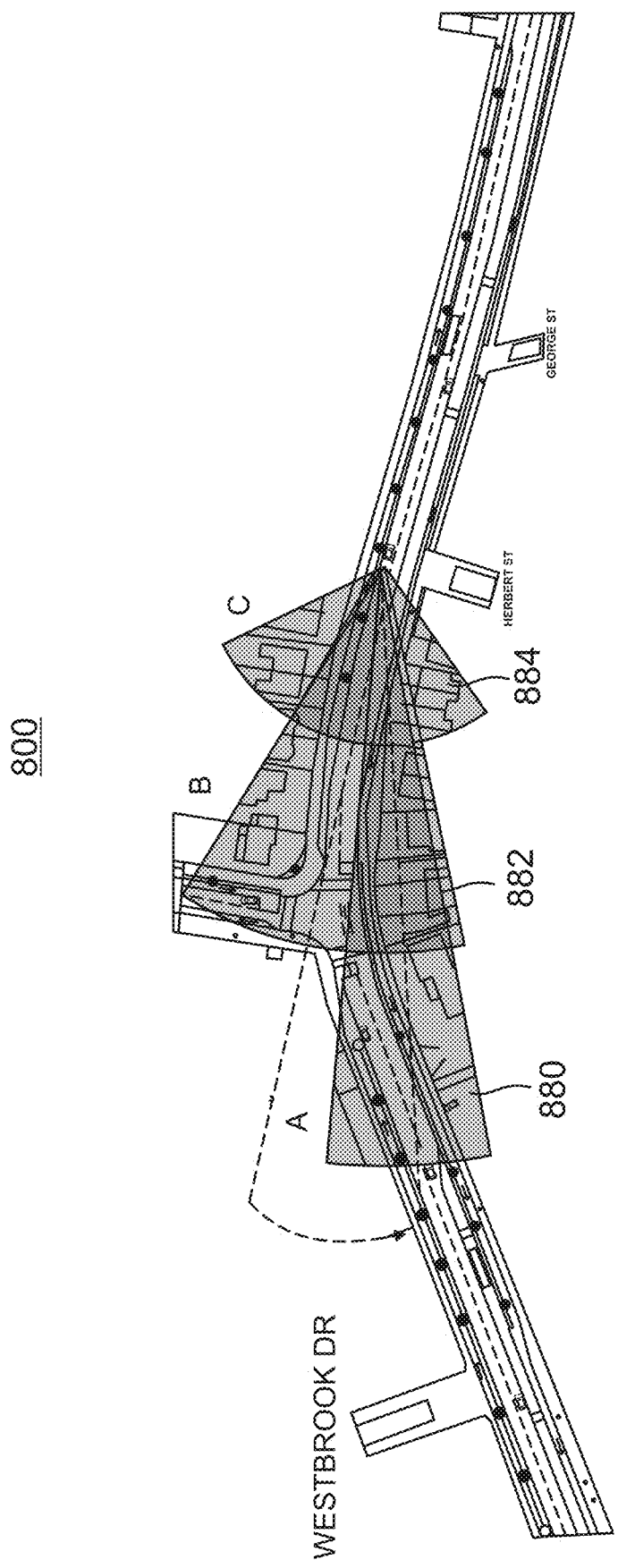
FIG. 8 is an example depiction of utilizing dynamic focus-centers to follow, angularly, a moving region or object of interest, according to an embodiment.

FIG. 8 is a diagram 800 of three fields of regard (FOR) 880 (A), 882 (B), and 884 (C), according to an embodiment. For example, the angles (relative to an autonomous automobile) of one or more beams within the FOR A 880 can be continuously updated while the autonomous automobile is making a turn so that the center axis of the FOR A 880 is aligned with the center of the roadway, while the angles of one or more beams within each of the FOR B 882 and FOR C 884 can maintain the same angles during the turn.

FIGS. 9A-9F illustrate a storyboard describing radar-sensor resource allocation, in the form of multiple FORs, for an autonomous automobile as it enters, executes, and exits a U-turn maneuver on a highway or other roadway, according to an embodiment.

FIG. 9A illustrates the U-turn performed by an autonomous automobile 990. The autonomous automobile 990 moves through a sequence of positions A through E to perform the U-turn as will be subsequently described.

FIG. 9B illustrates the autonomous automobile 990 driving on the highway 992. A radar subsystem in the autonomous automobile 990 radiates transmit beams, and receives receive beams, including a frontal facing long range beam 994A, side (blind spot monitoring) beams 994B, 994C, a first rear facing beams 994D, a second rear facing beam 994E, and a frontal broad area beam 994F. The frontal facing long range beam 994A has relatively high-range Doppler resolution. The side beams 994B, 994C have relatively good Doppler resolution to detect vehicles adjacent to or in front of or in back of the autonomous automobile 990; the side beams 994B, 994C are also used to determine the edges of the highway 992. The frontal broad area beam 994F is used to register the location of the autonomous automobile 990 on the highway 992. The first rear facing beam 994D and the second rear facing beam 994E are used to monitor activity behind the autonomous automobile 990. The second rear facing beam 994E may also be used to monitor blind spots behind the autonomous automobile 990. The frontal, rear, and side beams can be used to allow the autonomous automobile 990 to avoid hitting or being hit by other vehicles, pedestrians, animals, etc.

FIG. 9C illustrates the vehicle 990 approaching and entering the turn out. Measurement emphasis is shifted to the turn-out region (3), utilizing set(s) of beams to interrogate the region (3) with high fidelity. The navigation system does not fully relinquish the measuring of the highway, so the beams (1,2,4) persist.

Referring to FIG. 9D, with the vehicle 990 having stopped in the turn-out, the navigation system shifts measurement priority to oncoming traffic at long-range (1) and in proximity (3), as well as high-resolution imaging of the barrier and turn vicinity (3). The intended lane is also checked for clearance (5). The navigation system maintains at least some resources allocated to the previous lanes (4) to watch for possible rear-end events.

Referring to FIG. 9E, during turn execution, the navigation system onboard the car 990 uses a majority of sensor resources to measure and to confirm clearance in the oncoming traffic lanes at all ranges for which the navigation system is configured, and in both main travel directions along the roadway.

And referring to FIG. 9F, the car 990 having completed the turn and having merged back into traffic, the navigation system returns to a configuration similar to the configuration described above in conjunction with FIG. 9B, but with the car now heading in the opposite direction.

Figure 10:
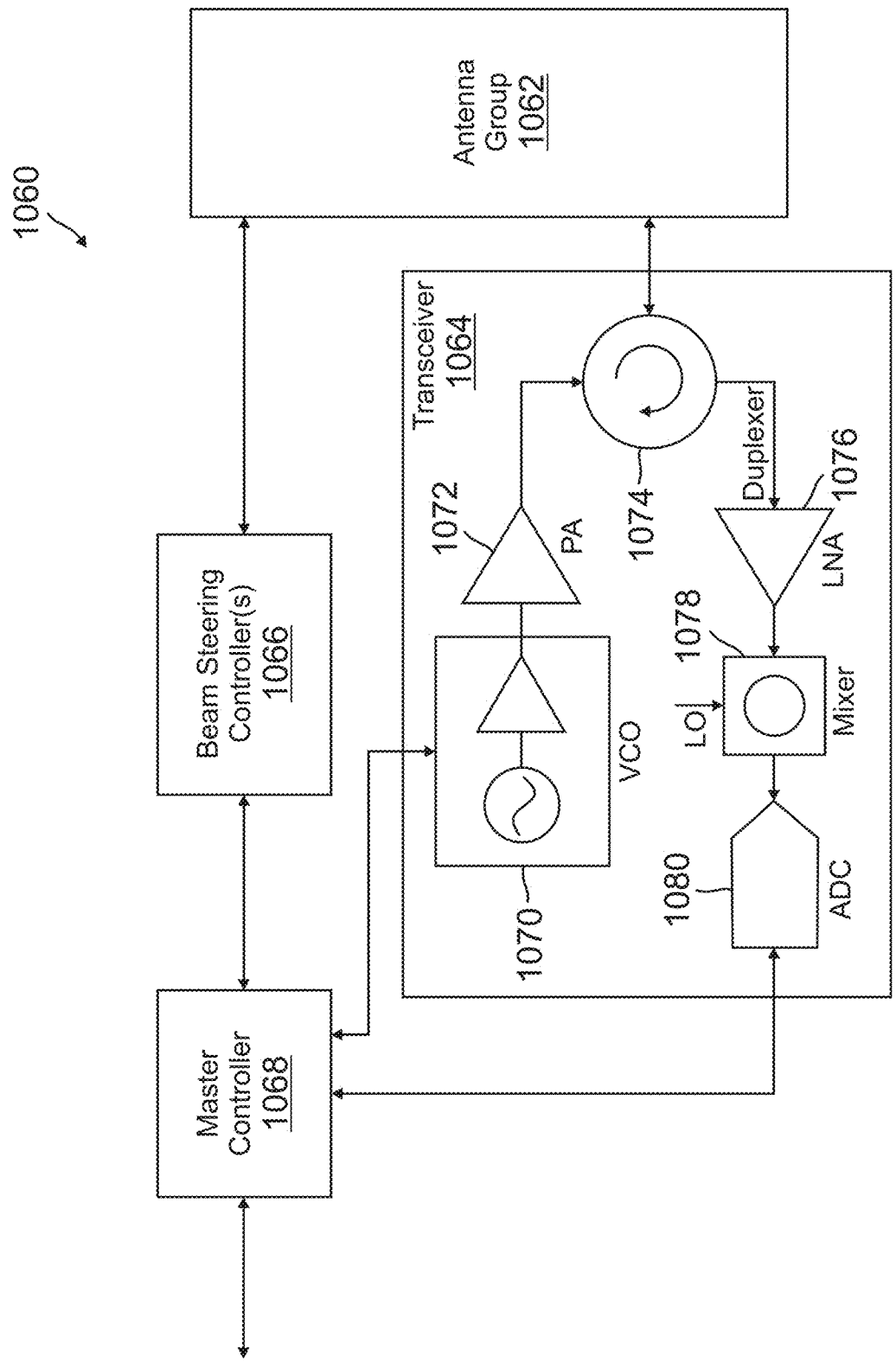
FIG. 10 is a block diagram of a radar subsystem that includes one or more of the sensors, sensor subsystems and systems, and other subsystems and systems of FIGS. 1-9F, according to an embodiment.

FIG. 10 is a block diagram of a radar subsystem 1060, which includes an antenna group 1062 having one or more of the antennas 1064, according to an embodiment. For example, the radar subsystem may be configured to perform one or more of the functions described above in conjunction with FIGS. 1-9F, and may be similar to one or both of the radar subsystems 104 (FIG. 1) and 220 of FIG. 2, according to an embodiment.

In addition to the antenna group 1062, the radar subsystem 1060 includes a transceiver 1064, a beam-steering controller 1066, and a master controller 1068.

The transceiver 1064 includes a voltage-controlled oscillator (VCO) 1070, a preamplifier (PA) 1072, a duplexer 1074, a low-noise amplifier (LNA) 1076, a mixer 1078, and an analog-to-digital converter (ADC) 1080. The VCO 1070 is configured to generate a reference signal having a frequency $f_0 = c/\lambda_0$, which is the frequency for which at least one of the antennas of the antenna group 1062 is designed. The PA 1072 is configured to amplify the VCO signal, and the duplexer 1074 is configured to couple the reference signal to the antennas of the antenna group 1062 via one or more signal feeders (not shown in FIG. 10). One or both of the duplexer 1074 and antenna group 1062 can include one or more of the signal feeders. The duplexer 1074 is also configured to receive signals from the antennas of the antenna group 1062, and to provide these received signals to the LNA 1076, which is configured to amplify these received signals. The mixer 1078 is configured to shift the frequencies of the amplified received signals down to a base band, and the ADC 1080 is configured to convert the down-shifted analog signals to digital signals for processing by the master controller 1068.

The beam-steering controller 1066 is configured to steer the beams (both transmitting and receiving beams) generated by the one or more antennas of the antenna group 1062 by generating the bias and neutral control signals to the bias lines of the antenna units that form the antennas of the antenna group 1062 as a function of time and main-beam position. By appropriately generating the control signals, the beam-steering controller 1066 is configured to selectively activate and deactivate the antenna elements of the antenna units according to selected spatial and temporal patterns. And if the one or more signal feeders (not shown in FIG. 10) are dynamically configurable to shift the phase or to alter the amplitude of a fed signal, then the beam-steering controller 1066 also is configured to control the one or more signal feeders with one or more feeder control signals.

The master controller 1068 is configured to control the transceiver 1064 and the beam-steering controller 1066, and to analyze the digital signals from the ADC 1080. For example, assuming that the one or more antennas of the antenna group 1062 are designed to operate at frequencies in a range centered about $f_0$, the master controller 1068 is configured to adjust the frequency of the signal generated by the VCO 1070 for, e.g., environmental conditions such as weather, the average number of objects in the range of the one or more antennas of the antenna assembly, and the average distance of the objects from the one or more antennas, and to conform the signal to spectrum regulations. Furthermore, the master controller 1068 is configured to analyze the signals from the ADC 1080 to, e.g., identify a detected object, and to determine what action, if any, that a system including, or coupled to, the radar subsystem 1060 should take. For example, if the system is a self-driving vehicle or a self-directed drone, then the master controller 1068 is configured to determine what action (e.g., braking, swerving), if any, the vehicle should take in response to the detected object.

Operation of the radar subsystem 1070 is described below, according to an embodiment. Any of the system components, such as the master controller 1068, can store in a memory, and execute, software/program instructions to perform the below-described actions. Alternatively, any of the system components, such as the system controller 1068, can store, in a memory, firmware or other configuration data that, when loaded into configuration circuitry, configures one or more of the system components to perform the below-described actions. Or any of the system components, such as the master controller 1068, can be hardwired to perform the below-described actions.

The master controller 1068 generates a control voltage that causes the VCO 1070 to generate a reference signal at a frequency within a frequency range centered about $f_0$. For example, $f_0$ can be in the range of approximately 5 Gigahertz (GHz)-100 GHz.

The VCO 1070 generates the signal, and the PA 1072 amplifies the signal and provides the amplified signal to the duplexer 1074.

The duplexer 1074 can further amplify the signal, and couples the amplified signal to the one or more antennas of the antenna group 1062.

While the duplexer 1074 is coupling the signal to the one or more antennas of the antenna group 1062, the beam-steering controller 1066, in response to the master controller 1068, is generating bias and neutral control signals to the antenna units of the one or more antennas of the antenna group 1062, and, if one or more dynamic signal feeders are present, then the beam-steering controller also is generating control signals to these feeders. These control signals cause the one or more antennas to generate and to steer one or more main signal-transmission beams. The bias and neutral control signals cause the one or more main signal-transmission beams to have desired characteristics, and also cause the side lobes to have desired characteristics such as suitable total side-lobe power and a suitable side-lobe level (e.g., between the smallest main signal-transmission beam and the largest side lobe).

Then, the master controller 1068 causes the VCO 1070 to cease generating the reference signal.

Next, while the VCO 1070 is generating no reference signal, the beam-steering controller 1066, in response to the master controller 1068, generates control signals to the antenna units of the one or more antennas of the antenna group 1062, and, if one or more dynamic signal feeders are present, then the beam-steering controller is generating control signals to these feeders. These control signals cause the one or more antennas to generate and to steer one or more main signal-receive beams. The control signals cause the one or more main signal-receive beams to have desired characteristics, and also cause the side lobes to have desired characteristics such as suitable total side-lobe power and a suitable side-lobe level. Furthermore, the beam-steering controller 1066 can generate the same sequence of control signals for steering the one or more main signal-receive beams as it does for steering the one or more main signal-transmit beams.

Then, the duplexer 1074 couples signals received by the one or more antennas of the antenna group 1062 to the LNA 1076.

Next, the LNA 1072 amplifies the received signals.

Then, the mixer 1078 down-converts the amplified received signals from a frequency, e.g., at or near $f_0$, to a baseband frequency.

Next, the ADC 1080 converts the analog down-converted signals to digital signals.

Then, the master system controller 1068 analyzes the digital signals to obtain information from the signals and to determine what, if anything, should be done in response to the information obtained from the signals.

The master system controller 1068 can repeat the above cycle one or more times.

Still referring to FIG. 10, alternate embodiments of the radar subsystem 1060 are contemplated. For example, the radar subsystem 1060 can include one or more additional components not described above, and can omit one or more of the above-described components. Furthermore, alternate embodiments described elsewhere in conjunction with FIGS. 1-9 and 11 may apply to the radar subsystem 1060 of FIG. 10.

FIG. 11 is a block diagram of a system, such as a vehicle system 1090, which includes the radar subsystem 1060 of FIG. 10, according to an embodiment. For example, the vehicle system 1090 can be an unmanned aerial vehicle (UAV) such as a drone, or a self-driving (autonomous) car.

In addition to the radar subsystem 1060, the vehicle system 1090 includes a drive assembly 1092 and a system controller 1094.

The drive assembly 1092 includes a propulsion unit 1096, such as an engine or motor, and a steering unit 1098, such as a rudder, flaperon, pitch control, or yaw control (for, e.g., an UAV or drone), or a steering wheel linked to steerable wheels (for, e.g., a self-driving car).

The system controller 1094 is configured to control, and to receive information from, the radar subsystem 1060 and the drive assembly 1092. For example, the system controller 1094 can be configured to receive locations, sizes, and speeds of nearby objects from the radar subsystem 1060, and to receive the speed and traveling direction of the vehicle system 1090.

Operation of the vehicle system 1090 is described below, according to an embodiment. Any of the system components, such as the system controller 1094, can store in a memory, and can execute, software/program instructions to perform the below-described actions. Alternatively, any of the system components, such as the system controller 1094, can store, in a memory, firmware or other configuration data that, when loaded into configuration circuitry, configures one or more of the system components to perform the below-described actions. Or any of the system components, such as the system controller 1094, can be circuitry hardwired to perform the below-described actions.

The system controller 1094 activates the radar subsystem 1060, which, as described above in conjunction with FIG. 10, provides to the system controller information regarding one or more objects in the vicinity of the vehicle system 1090. For example, if the vehicle system 1090 is an UAV or a drone, then the radar subsystem can provide information regarding one or more objects (e.g., birds, aircraft, and other UAVs/drones), in the flight path to the front, sides, and rear of the UAV/drone. Alternatively, if the vehicle system 1090 is a self-driving car, then the radar subsystem 1060 can provide information regarding one or more objects (e.g., other vehicles, debris, pedestrians, bicyclists) in the roadway to the front, sides, and rear of the vehicle system.

In response to the object information from the radar subsystem 1060, the system controller 1094 determines what action, if any, the vehicle system 1090 should take in response to the object information. Alternatively, the master controller 1068 (FIG. 10) of the radar subsystem can make this determination and provide it to the system controller 1094.

Next, if the system controller 1094 (or master controller 1068 of FIG. 10) determined that an action should be taken, then the system controller causes the drive assembly 1092 to take the determined action. For example, if the system controller 1094 or master controller 1068 determined that a UAV system 1090 is closing on an object in front of the UAV system, then the system controller 1094 can control the propulsion unit 1096 to reduce air speed. Or, if the system controller 1094 or master controller 1068 determined that an object in front of a self-driving system 1090 is slowing down, then the system controller 1094 can control the propulsion unit 1096 to reduce engine speed and to apply a brake. Or if the system controller 1094 or master controller 1068 determined that evasive action is needed to avoid an object (e.g., another UAV/drone, a bird, a child who ran in front of the vehicle system 1090) in front of the vehicle system, then the system controller 1094 can control the propulsion unit 1096 to reduce engine speed and, for a self-driving vehicle, to apply a brake, and can control the steering unit 1098 to maneuver the vehicle system away from or around the object.

Still referring to FIG. 11, alternate embodiments of the vehicle system 1090 are contemplated. For example, the vehicle system 1090 can include one or more additional components not described above, and can omit one or more of the above-described components. Furthermore, the vehicle system 1090 can be a vehicle system other than a UAV, drone, or self-driving car. Other examples of the vehicle system 1090 include a watercraft, a motor cycle, a car that is not self-driving, and a spacecraft. Moreover, a system including the radar subsystem 1060 can be other than a vehicle system. In addition, the vehicle system 1090 can be configured to perform any functions or operations described above in conjunction with FIGS. 1-9F. Furthermore, alternate embodiments described elsewhere in conjunction with FIGS. 1-10 may apply to the vehicle system 1090 of FIG. 11.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. In addition, any described component or operation may be implemented/performed in hardware, software, firmware, or a combination of any two or more of hardware, software, and firmware. Furthermore, one or more components or steps of a described apparatus or system, or method, respectively, may have been omitted from the description for clarity or another reason. Moreover, one or more components or steps of a described apparatus or system, or method, respectively, that have been included in the description may be omitted from the apparatus, system, or method. In addition, it will be appreciated by those of ordinary skill in the art that any arrangement, which is calculated to achieve the same purpose, may be substituted for the specific embodiments shown.

Example Embodiments

1) A radar sensor configured for dynamically (in real-time, or at regular intervals) controlling its angular field of regard in azimuth and elevation, and/or for controlling the angular resolution at which the angular fields of regard are made, subject to sensor resource constraints.
2) A radar sensor configured to control its instantaneous angular field-of-regard via reshaping of the gain pattern (direction in AzE1, beamwidth in AzE1, Side Lobes in AzE1) of one or more transmit and/or receive antennas.
3) A radar sensor configured to control its composite angular field of regard via allocation of a sequence of transmit/receive gain patterns, each of which defines an instantaneous sub field of view, and taken in aggregate form the total field of view pattern.
4) A radar sensor configured for dynamically (in real-time, or at regular intervals) controlling the range and velocity extents over which measurements are made, and the resolution(s) at which those measurements are made (collectively, the range-Doppler manifold), subject to sensor resource constraints.
5) A radar sensor configured to control its range-Doppler manifold via modification of the synthesized waveform (complex voltage value of a signal vs. time) that is emitted by the transmit antenna.
6) A radar sensor configured to control its range-Doppler map via modification of the processing chain of the signal that is received by the receive antenna.
7) A radar sensor configured for dynamically (in real-time, or at regular intervals) controlling the 4-dimensional hypervolume (azimuth, elevation, range, and velocity) extents over which a measurement is made, and the resolution over which measurements are made therein, subject to sensor resource constraints, by controlling an instantaneous field-of-regard through control of an instantaneous gain-pattern and through control over an instantaneous range-Doppler manifold through control of the synthesized waveform and signal processing.
8) A radar sensor configured for dynamically (in real-time, or at regular intervals) controlling the 4-dimensional hypervolume (azimuth, elevation, range, and velocity) extents over which a measurement is made, and the resolution over which measurements are made therein, subject to sensor resource constraints, by controlling a total (sequenced over time) field of regard through control of a sequence of instantaneous gain-patterns, each of which possesses an instantaneously controlled range-Doppler manifold, to produce a total (over time) 4D cube of interrogation.
9) A unit (e.g., HAV) having a sensor of one of examples 1-8 configured, in response to intelligence that exists internal to the unit, to detect, dynamically, an object.
10) A unit having a sensor of one of examples 1-8 configured, in response to intelligence that exists internal to the unit, to track, dynamically, an object.
11) A unit having a sensor of one of examples 1-8 configured, in response to intelligence that exists internal to the unit, to classify, dynamically, an object.
12) A unit having a sensor of one of examples 1-8 configured, in response to intelligence that exists internal to the unit, to determine, dynamically, a number of objects.
13) A unit having a sensor of one of examples 1-8 configured, in response to intelligence that exists internal to the unit, to determine, dynamically, a level of noise.
14) A unit having a sensor of one of examples 1-8 configured, in response to intelligence that exists internal to the unit, to determine, dynamically, a level of clutter.
15) A unit having a sensor of one of examples 1-8 configured, in response to intelligence that exists internal to the unit, to determine, dynamically, a level of interference.
16) A unit having a sensor of one of examples 1-8 configured to analyze data generated by the sensor and to perform a function dynamically in response to the analyzed data.
17) A unit having a sensor of one of examples 1-8, the unit configured to receive data regarding environmental conditions from external sources (e.g., from other HAV's via vehicle to vehicle communication) and configured to configure the sensor dynamically to perform a function in response to the received data.
18) A radar sensor configured to control, dynamically, generation of a 4D measurement data-cube by controlling a parameter of a field of regard so as to direct measurement resources to interesting or important or priority areas of a field of view.
19) A radar sensor configured to control, dynamically, generation of a 4D measurement data-cube by controlling a parameter of a field of regard to avoid measuring the sky, or other empty (e.g., devoid of objects detectable by the radar sensor) areas.
20) A radar sensor configured to control, dynamically, generation of a 4D measurement data-cube by controlling a parameter of a field of regard to avoid measuring large areas irrelevant to the primary task, such as grass fields to the side of highways for a HAV.
21) A radar sensor configured to control, dynamically, generation of a 4D measurement data-cube by controlling a parameter of a field of regard to control measurement of regions which produce interference, either to avoid measurement completely via exclusion from field-of-regard or to bin/contain the measurement to beams which have processing specifically to handle the interference/clutter.
22) A radar sensor configured to control, dynamically, generation of a 4D measurement data-cube by controlling a parameter of a field of regard to measure, with higher resolution or more frequently, areas that are of interest or priority.
23) A radar sensor configured to control, dynamically, generation of a 4D measurement data-cube by controlling a parameter of a field of regard to anticipate upcoming needed measurements, and to begin setup/sequence to make the upcoming needed measurements.
24) A radar sensor configured to control, dynamically, generation of a 4D measurement data-cube by controlling a parameter of a field of regard to adjust, actively, measurement to follow a region of interest, either spatially or in an RD-manifold.

25) A radar sensor configured to control, dynamically, generation of a 4D measurement data-cube by controlling one or more long-range beams within a field of regard to follow a curve of a road.
26) A radar sensor configured to control, dynamically, generation of a 4D measurement data-cube by causing a region of interest or priority within a field of regard to yield a higher measurement accuracy or a higher measurement rate than another region within the field of regard.
27) A radar sensor configured to control, dynamically, generation of a 4D measurement data-cube by utilizing internal or external analysis of information obtained from a field of regard and internal or external control of a least one parameter of the field of regard.
28) A radar sensor configured to control, dynamically, generation of a 4D measurement data-cube by controlling measurement ranges utilized over a field of regard, e.g., 300 m range down a freeway, but only use 5 m off to the sides/barriers.
29) A radar sensor configured to control, dynamically, generation of a 4D measurement data-cube by actively prioritizing the measurement update rates across a field of regard.
30) The radar sensor of examples 18-29 where the radar sensor is configured to control, dynamically, generation of the 4D data-cube by controlling an angular dimension of the field of regard.
31) The radar sensor of examples 18-29 where the radar sensor is configured to control, dynamically, generation of the 4D data-cube by controlling an angular resolution of a measurement made within a field of regard subject to constraints of the radar sensor.
32) The radar sensor of examples 18-29 where the radar sensor is configured to control, dynamically, generation of the 4D data-cube by controlling its instantaneous angular field of regard via reshaping of the gain pattern (e.g., direction in AzE1, beam width in AzE1, Side Lobes in AzE1) of one or more transmit and/or receive antennas.
33) The radar sensor of examples 18-29 where the radar sensor is configured to control, dynamically, generation of the 4D data-cube by controlling its composite angular field of regard via allocation of a sequence of transmit/receive gain-patterns, each of which defines an instantaneous subfield of view, and taken in aggregate form the total field-of-view pattern.
34) The radar sensor of examples 18-29 where the radar sensor is configured to control, dynamically, generation of the 4D data-cube by controlling the range and velocity extents over which measurements are made, and the resolution(s) at which those measurements are made (collectively, the range-Doppler manifold), subject to sensor resource constraints.
35) The radar sensor of examples 18-29 where the radar sensor is configured to control, dynamically, generation of the 4D data-cube by controlling its range-Doppler manifold via modification of the synthesized waveform (complex voltage value of a signal vs. time) which is emitted by the transmit antenna.
36) The radar sensor of examples 18-29 where the radar sensor is configured to control, dynamically, generation of the 4D data-cube by controlling its range-Doppler map via modification of the processing chain of the signal which is received by the receive antenna.
37) The radar sensor of examples 18-29 where the radar sensor is configured to control, dynamically, generation of the 4D data-cube by controlling the 4-dimensional hyper-volume (azimuth, elevation, range, and velocity) extents over which a measurement is made, and the resolution over which measurements are made therein, subject to sensor resource constraints.
38) The radar sensor of examples 18-29 where the radar sensor is configured to control, dynamically, generation of the 4D data-cube by controlling the 4-dimensional hyper-volume (azimuth, elevation, range, and velocity) extents over which a measurement is made, and the resolution over which measurements are made therein, subject to sensor resource constraints by controlling an instantaneous field of regard through control of an instantaneous gain pattern, and combined with control over an instantaneous range Doppler manifold.
39) The radar sensor of examples 18-29 where the radar sensor is configured to control, dynamically, generation of the 4D data-cube by controlling the 4-dimensional hyper-volume (azimuth, elevation, range, and velocity) extents over which a measurement is made, and the resolution over which measurements are made therein, subject to sensor resource constraints by controlling a total (sequenced over time) field of regard through control of a sequence of instantaneous gain patterns, each of which possesses a instantaneously controlled range Doppler manifold, to produce a total (over time) 4D cube of interrogation.
40) The radar sensor of examples 18-29 where the radar sensor is configured to control, dynamically, generation of the 4D data-cube utilizing intelligence that exists either internal or external to the radar sensor.
41) A radar-beam scheduler circuit configured to sequence radar-beam generator through a set of beams in a predetermined order, e.g., a list of beams.
42) The radar-beam scheduler of examples 41 wherein the beams of the list have at least one characteristic in common.
43) A radar-beam scheduler circuit configured to generate at least one set-of-lists of radar beams, e.g. a schedule of beams.
44) A radar-beam scheduler circuit configured to cause a radar-beam generator to loop through a set of radar beams for a predetermined number of times or until an external source causes the radar-beam generator to halt looping through the set of radar beams.
45) A radar-beam scheduler circuit configured to sequence a radar-beam generator through a first set of beams one or more times and then to switch to sequencing the radar-beam generator through a second set of beams in response to a toggle event, the switch occurring at a predetermined time after the toggle event or upon completion of generating a current beam of the first set of beams.
46) A radar system configured to alter a radar beam's angle in response to received information regarding a field of regard.
47) A radar system configured to alter a radar beam's angle to track an object or location such as a center of a curving roadway.
48) A radar system configured to alter a reference angle applied to a list or set of beams, e.g., a beam-list focus angle.
49) A radar system configured to alter the angle of a list of beams to track or follow an object or location.
50) A radar system configured to alter a radar beam's angle in response to a command.
51) A radar system configured to alter a beam-list reference angle in response to a command.

52) A radar system configured to alter a radar beam's angle according to a schedule.
53) A radar system configured to alter a beam-list reference angle according to a schedule.
54) A radar system configured to buffer a next transmit beam.
55) A radar system configured to buffer a next receive beam.
56) A radar system configured to buffer a waveform to be synthesized.
57) A radar system configured to buffer a next processing to be performed.
58) A radar sensor having a first interface configured to provide data from the sensor and a second interface configured to receive sensor commands.
59) A system including an autonomous vehicle and at least one radar sensor of any one of the preceding examples disposed on the vehicle.
60) A system including an autonomous vehicle and at least one radar-beam schedule of any one of the preceding examples disposed on the vehicle.
61) A system including an autonomous vehicle and at least one radar system of any one of the preceding examples disposed on the vehicle.
62) A radar sensor, or radar system for autonomous vehicles, which dynamically, in real-time, or at regular intervals, controls its angular field of regard: and/or controls the angular resolution at which the angular field of regard is are made, subject to sensor resource constraints.
   62a) ... which controls its instantaneous angular field-of-regard via reshaping of the gain-pattern (direction in AzE1, beamwidth in AzE1, Side Lobes in AzE1) one or more transmit and/or receive antennas.
   62b) ... which controls its composite angular field-of-regard via allocation of a sequence of transmit/receive gain-patterns, each of which defines an instantaneous sub-field-of-view, and taken in aggregate form the total field-of-view pattern.
63) A radar sensor or radar system for autonomous vehicles, which dynamically in real-time, or at regular intervals, controls the range and velocity extents over which measurements are made, and the resolution(s) at which those measurements are made (collectively, the range-Doppler manifold), subject to sensor resource constraints.
   63a) A radar sensor which controls its range-Doppler manifold via modification of the synthesized waveform (complex voltage value of a signal vs. time) which is emitted by the transmit antenna.
   63b) A radar sensor which controls its range-Doppler map via modification of the processing chain of the signal which is received by the receive antenna.
64) A radar sensor, or radar system for autonomous vehicles, which dynamically, in real-time, or at regular intervals, controls the 4-dimensional hypervolume (azimuth, elevation, range, and velocity) extents over which a measurement is made, and the resolution over which measurements are made therein, subject to sensor resource constraints, by:
   64a) ... controlling an instantaneous field-of-regard through control of an instantaneous gain-pattern, and combined with control over an instantaneous range-Doppler manifold.
   64b) ... controlling a total (sequenced over time) field-of-regard through control of a sequence of instantaneous gain-patterns, each of which possess an instantaneously controlled range-Doppler manifold, to produce a total (over time) 4D cube of interrogation.
65) A radar sensor which utilizes the above (examples 1-8 and 62-64) methods of dynamic control of a 4D measurement data-cube to ...
   65a) ... to exclude wasting measurement resources on uninteresting areas.
      For example(s):
      65a i) ... avoid measuring the sky
      65a ii) ... avoid measuring large areas irrelevant to the primary task, such as empty fields to the side of highways for a HAV.
   65b) ... to control measurement of regions which produce interference, either to avoid measurement completely via exclusion from field-of-regard or to bin/contain the measurement to beams which have processing specifically to handle the interference/clutter.
      For example(s):
      65b i) ... to separate/bin measurement of the guardrails on roads, which are a known source of clutter and can produce false-positives.
      65b ii) ... to omit measurement of the underside of overpass structural beams, which are a known source of strong clutter and can produce false-positives.
   65c) ... to more accurately or frequently measure areas which are of interest or priority.
      For example(s):
      65c i) ... to employ faster update rate at the center/apex of the drive path,
      65c ii) ... to employ faster update rate on identified objects of priority/e.g. vehicles merging into the HAV's current lane.
      65c iii) ... to employ faster update rates on side FOR and blind-spots when passing merge points or intersections.
   65d) ... to prepare for upcoming measurement needs, and begin setup/sequence to measure these.
      For example(s):
      65d i) ... to schedule long-range side-looking beams when the drive course dictates the HAV will shortly come to a T-intersection.
      65d ii) ... to calculate and schedule the approach angle to a T-intersection, allowing pre-look before the 90 degree intersection.
      65d iii) ... to prepare and queue high resolution close-range and/or emergency braking beam schedules when the driving course dictates the HAV will shortly be merging into dense traffic.
   65e) ... to actively adjust measurement to follow a region of interest, either spatially or in the RD-manifold.
      For example(s):
      65e i) ... having a list/set of long-range beams follow the curve of a road.
      65e ii) ... having a list/set of high range-doppler resolution beams follow a bicyclist riding on the roadside.
      65e iii) ... having a list/set of high-range-doppler resolution beams follow pedestrian(s) utilizing a crosswalk.
      65e iv) ... having a list/set of beams follow the horizon/drive-apex on hilly roads, (requiring adjustment in elevation).
   65f) ... to control the measurement ranges utilized over a field-of-regard.
      For example(s):
      65f i) ... employ 300 m range beams down a freeway, but only use 5m off to the sides/barriers.

65f ii) . . . employ 300 m range beams to left and right when coming to a T-intersection, but discontinue those beams to free the resources, after the T-intersection turn is complete.

66) A sensor with dynamic control, such as those describe above in examples 62-64 and 1-8, performing tasks such as those described above in examples 9-49 and 65, which is tasked by intelligence that exists either internal or external to the sensor.

66a) . . . tasked by Internal intelligence, arising directly from analysis of the sensors own data.
For example(s):
66a i) . . . determination of the number of objects in a field-of-regard.
66a ii) . . . tracking/following of detected objects.
66a iii) . . . determination of the sensor noise-level.
66a iv) . . . determination of the interference level, resulting from other proximate signals.
66a v) . . . determination of weather such as rain/snow, from analysis of volumetric noise and signal reflection.

66b) . . . tasked by Internal intelligence, arising from analysis of data input from other sensors or sources.
For example(s):
66b i) . . . fusion of of input GPS location data, paired with input/stored map data, to intelligently task beams along roads.
66b ii) . . . use of input velocity data, to determine optimal measurement ranges.
66b iii) . . . internal analysis of camera and lidar data (either raw or processed) to select beams for classification verification.

66c) . . . tasked by External intelligence, arising from planning or reactionary analysis of data, fused from multiple sensors and pre-existing databases.
For example(s):
66c i) . . . field-of-regard, beam, list, and schedule control based on general environment and conditions, such as configurations for city driving, highway driving, traffic hours, road-types such as gravel or paved, weather such as rain snow or fog,
66c ii) . . . field-of-regard, beam, list, and schedule control based on specific environments and conditions, such as configurations for passing through tunnels, or passing under overpasses.
66c iii) . . . field-of-regard, beam, list, and schedule control based on common driving maneuvers, such as configurations for merging onto highways, making lane-changes, making unprotected turns, negotiating stop-sign intersections, negotiating crosswalks, etc.
66c iv) . . . field-of-regard, beam, list, and schedule control based on detailed map data, enabling prioritization of resources along roads and along planned drive route.
66c v) . . . field-of-regard, beam, list, and schedule control based on accumulated historical/statistical data, e.g. geolocated radar database that indicates other cars always experience clutter arising from certain areas/volumes.
66c vi) . . . beam, list, and schedule creation and control to prioritize measurement of known/detected objects.
66c vii) . . . beam, list, and schedule creation and control to fill in missing or weak information from other sensors, such as validation of range for cameras, and validation of longer-range detections for lidars.

67) Nested loops: an architecture for implementing RBS that avoids the conflicts and race-conditions of a traditional push/pop stack.
67a) Creation of lists: a pre-sequenced set of beams.
67a i) Lists can serve as a handy container, e.g. set of beams that share some commonality, or desire to be grouped to simplify handling or later processing.
67b) Creation of a Schedule: a list of lists.
67b i) Schedule allows for low-overhead direction/encapsulation of the self-sustaining (free-running) feedback loop within the radar.
(1) Schedules can be set to loop infinitely,
(2) or hop to a next schedule upon completion.
67c) "List toggles" events, as method for hopping from one schedule (list of lists)
67c i) Zero-conflict (no race conditions possible) method to allow fast user control over the resources (which beams are fired at what time).
67c ii) Toggle events can be instantaneous, ASAP (upon completion of current beam) or time-scheduled.

68) Concept of "Focus center" a reference angle for beam azimuth and elevations.
68a) Focus centers can be applied to individual beams, though this is identical to changing the beam angle (az/el).
68b) Focus centers applied to lists, allowing smooth control over the angle of a group of beams.
68b i) For example, a group of long-range beams that user wants to keep centered on a curving highway
68c) Focus update commands can be applied ASAP (to take effect on next beam), or in a time-scheduled (to take effect at a given time).

69) Buffering, allowing fast-toggle.
69a) Pre-buffering of the next beam to be directed via the Tx ESA(s).
69b) Pre-buffering of the next beam to be receive via the Rx ESA(s).
69c) Pre-buffering of the next waveform to be synthesized
69d) Pre-buffering of the next processing to be performed.

70) Separation of Receive Data flow out of the sensor from input Command & Control (C2) port, preventing conflicts and overhead in the C2 interface.

Further Example Embodiments

Example 1 includes a radar subsystem, comprising: at least one antenna configured to radiate at least one first transmit beam and to form at least one first receive beam; and a control circuit configured to steer the at least one first transmit beam and the at least one first receive beam over a first field of regard during a first time period, and to steer the at least one first transmit beam and the at least one first receive beam over a second field of regard during a second time period.

Example 2 includes the radar subsystem of Example 1 wherein the control circuit is configured to transition from steering the at least one first transmit beam and the at least one first receive beam over the first field of regard to the second field of regard in response to a command.

Example 3 includes the radar subsystem of any of Examples 1-2 wherein the control circuit is configured to transition from steering the at least one first transmit beam and the at least one first receive beam over the first field of regard to the second field of regard in response to an occurrence of an event.

Example 4 includes the radar subsystem of any of Examples 1-3 wherein the control circuit is configured to transition from steering the at least one first transmit beam and the at least one first receive beam over the first field of regard to the second field of regard in response to an interrupt signal.

Example 5 includes the radar subsystem of any of Examples 1-4 wherein the control circuit is configured to transition from steering the at least one first transmit beam and the at least one first receive beam over the first field of regard to the second field of regard in response to an elapse of an amount of time.

Example 6 includes the radar subsystem of any of Examples 1-5 wherein the control circuit is configured: to cause the at least one antenna to generate the at least one first transmit beam and the at least one first receive beam having a first transmit characteristic and a first receive characteristic, respectively, during a third period of time; and to cause the at least one antenna to generate the at least one first transmit beam and the at least one first receive beam having a second transmit characteristic and a second receive characteristic, respectively, during a fourth period of time.

Example 7 includes the radar subsystem of any of Examples 1-6 wherein: the at least one antenna is configured to radiate at least one second transmit beam and to form at least one second receive beam; and wherein the control circuit is configured to steer the at least one second transmit beam and the at least one second receive beam over a third field of regard that includes the first and second fields of regard during the first and second time periods.

Example 8 includes a method, comprising: radiating at least one first transmit beam; forming at least one first receive beam; steering the at least one first transmit beam and the at least one first receive beam over a first field of regard during a first time period; and steering the at least one first transmit beam and the at least one first receive beam over a second field of regard during a second time period.

Example 9 includes the method of Example 8, further comprising transitioning from steering the at least one first transmit beam and the at least one first receive beam over the first field of regard to the second field of regard in response to a command.

Example 10 includes the method of any of Examples 8-9, further comprising transitioning from steering the at least one first transmit beam and the at least one first receive beam over the first field of regard to the second field of regard in response to an occurrence of an event.

Example 11 includes the method of any of Examples 8-10, further comprising transitioning from steering the at least one first transmit beam and the at least one first receive beam over the first field of regard to the second field of regard in response to an interrupt signal.

Example 12 includes the method of any of Examples 8-11, further comprising transitioning from steering the at least one first transmit beam and the at least one first receive beam over the first field of regard to the second field of regard in response to an elapse of an amount of time.

Example 13 includes the method of any of Examples 8-12, further comprising: causing the at least one first transmit beam to have a first transmit characteristic during a third period of time; causing the at least one first receive beam to have a first receive characteristic during the third period of time; causing the at least one first transmit beam to have a second transmit characteristic during a fourth period of time; and causing the at least one first receive beam to have a second receive characteristic during the fourth period of time.

Example 14 includes the method of any of Examples 8-13, further comprising: radiating at least one second transmit beam; forming at least one second receive beam; and steering the at least one second transmit beam and the at least one second receive beam over a third field of regard that includes the first and second fields of regard during the first and second time periods.

Example 15 includes a non-transitory computer-readable medium storing instructions that, when executed by at least one processing circuit, cause the at least one processing circuit, or another circuit under control of the at least one processing circuit: to radiate at least one first transmit beam; to form at least one first receive beam; to steer the at least one first transmit beam and the at least one first receive beam over a first field of regard during a first time period; and to steer the at least one first transmit beam and the at least one first receive beam over a second field of regard during a second time period.

Example 16 includes the non-transitory computer-readable medium of Example 15 wherein the instructions, when executed by at least one processing circuit, further cause the at least one processing circuit, or another circuit under control of the at least one processing circuit to transition from steering the at least one first transmit beam and the at least one first receive beam over the first field of regard to the second field of regard in response to a command.

Example 17 includes the non-transitory computer-readable medium of any of Examples 15-16 wherein the instructions, when executed by at least one processing circuit, further cause the at least one processing circuit, or another circuit under control of the at least one processing circuit to transition from steering the at least one first transmit beam and the at least one first receive beam over the first field of regard to the second field of regard in response to an occurrence of an event.

Example 18 includes the non-transitory computer-readable medium of any of Examples 15-17 wherein the instructions, when executed by at least one processing circuit, further cause the at least one processing circuit, or another circuit under control of the at least one processing circuit to transition from steering the at least one first transmit beam and the at least one first receive beam over the first field of regard to the second field of regard in response to an interrupt signal.

Example 19 includes the non-transitory computer-readable medium of any of Examples 15-18 wherein the instructions, when executed by at least one processing circuit, further cause the at least one processing circuit, or another circuit under control of the at least one processing circuit to transition from steering the at least one first transmit beam and the at least one first receive beam over the first field of regard to the second field of regard in response to an elapse of an amount of time.

Example 20 includes the non-transitory computer-readable medium of any of Examples 15-19 wherein the instructions, when executed by at least one processing circuit, further cause the at least one processing circuit, or another circuit under control of the at least one processing circuit: to cause the at least one first transmit beam to have a first transmit characteristic during a third period of time; to cause the at least one first receive beam to have a first receive characteristic during the third period of time; to cause the at least one first transmit beam to have a second transmit characteristic during a fourth period of time; and to cause the at least one first receive beam to have a second receive characteristic during the fourth period of time.

Example 21 includes the non-transitory computer-readable medium of any of Examples 15-20 wherein the instructions, when executed by at least one processing circuit, further cause the at least one processing circuit, or another circuit under control of the at least one processing circuit: to radiate at least one second transmit beam; to form at least one second receive beam; and to steer the at least one second transmit beam and the at least one second receive beam over a third field of regard that includes the first and second fields of regard during the first and second time periods.

What is claimed:

1. A radar subsystem, comprising:
    at least one antenna configured to radiate at least one first transmit beam and to form at least one first receive beam; and
    a control circuit configured
        to steer the at least one first transmit beam and the at least one first receive beam over fields of regard,
        to receive, from the at least one first receive beam, information related to the fields of regard,
        to detect, in response to the information, a change related to at least one object within at least a first one of the fields of regard;
        to steer, in response to the detection of the change, the at least one first transmit beam and the at least one first receive beam over
            the at least a first one of the fields of regard according to a first value of an update rate, and
            at least a first other one of the fields of regard according to a second value of the update rate, and
        to steer the at least one first transmit beam and the at least on first receive beam over the at least a first one of the fields of regard according to a third value of the update rate a time after detecting the change.

2. The radar subsystem of claim 1 wherein the control circuit is configured to transition from steering the at least one first transmit beam and the at least one first receive beam over the at least a first one of the fields of regard to the at least a first other one of the fields of regard in response to a command.

3. The radar subsystem of claim 1 wherein the control circuit is configured to transition from steering the at least one first transmit beam and the at least one first receive beam over the at least a first one of the fields of regard to the at least a first other one of the fields of regard in response to an occurrence of an event.

4. The radar subsystem of claim 1 wherein the control circuit is configured to transition from steering the at least one first transmit beam and the at least one first receive beam over the at least a first one of the fields of regard to the at least a first other one of the fields of regard in response to an interrupt signal.

5. The radar subsystem of claim 1 wherein the control circuit is configured to transition from steering the at least one first transmit beam and the at least one first receive beam over the at least a first one of the fields of regard to the at least a first other one of the fields of regard in response to an elapse of an amount of time.

6. The radar subsystem of claim 1 wherein the control circuit is configured:
    to cause the at least one antenna to generate the at least one first transmit beam and the at least one first receive beam having a first transmit characteristic and a first receive characteristic, respectively, while steering the at least one first transmit beam and the at least one first receive beam over the at least a first one of the fields of regard; and
    to cause the at least one antenna to generate the at least one first transmit beam and the at least one first receive beam having a second transmit characteristic and a second receive characteristic, respectively, while steering the at least one first transmit beam and the at least one first receive beam over the at least a first other one of the fields of regard.

7. The radar subsystem of claim 1 wherein:
    the at least one antenna is configured to radiate at least one second transmit beam and to form at least one second receive beam; and
    the control circuit is configured
        to detect a change related to at least one object within at least a second one of the fields of regard, and
        to steer, in response to the detection of the changes, the at least one second transmit beam and the at least one second receive beam over
            the at least a second one of the fields of regard according to a fourth value of the update rate, and
            at least a second other one of the fields of regard according to a fifth value of the update rate, and
        to steer at least the second one of the fields of regard according to a sixth value of the update rate a time after detecting the change.

8. The radar subsystem of claim 1 wherein the first value of the update rate is higher than the second value of the update rate.

9. The radar subsystem of claim 1 wherein:
    the first value of the update rate is higher than the second value of the update rate; and
    the third value of the update rate is equal to the first value of the update rate.

10. The radar subsystem of claim 6 wherein:
    the first transmit characteristic includes a first transmit waveform;
    the first receive characteristic includes a first receive waveform;
    the second transmit characteristic includes a second transmit waveform; and
    the second receive characteristic includes a second receive waveform.

11. A method, comprising:
    radiating at least one first transmit beam;
    forming at least one first receive beam;
    steering the at least one first transmit beam and the at least one first receive beam over fields of regard;
    receiving, from the at least one first receive beam, information related to the fields of regard;
    detecting, based on the information, a change related to at least one object within at least a first one of the fields of regard; and
    steering, in response to the detection of the change, the at least one first transmit beam and the at least one first receive beam over
        the at least a first one of the fields of regard according to a first value of an update rate, and
        at least a first other one of the fields of regard according to a second value of the update rate, and
    steering the at least one first transmit beam and the at least one first receive beam over the at least a first one of the fields of regard according to a third value of the update rate a time after detecting the change.

12. The method of claim 11, further comprising transitioning from steering the at least one first transmit beam and the at least one first receive beam over the at least a first one of the fields of regard to the at least a first other one of the fields of regard in response to a command.

13. The method of claim 11, further comprising transitioning from steering the at least one first transmit beam and the at least one first receive beam over the at least a first one of the fields of regard to the at least a first other one of the fields of regard in response to an occurrence of an event.

14. The method of claim 11, further comprising transitioning from steering the at least one first transmit beam and the at least one first receive beam over the at least a first one of the fields of regard to the at least a first other one of the fields of regard in response to an interrupt signal.

15. The method of claim 11, further comprising transitioning from steering the at least one first transmit beam and the at least one first receive beam over the at least a first one of the fields of regard to the at least a first other one of the fields of regard in response to an elapsed of an amount of time.

16. The method of claim 11, further comprising:
causing the at least one first transmit beam to have a first transmit characteristic while steering the at least one first transmit beam over the at least a first one of the fields of regard;
causing the at least one first receive beam to have a first receive characteristic while steering the at least one first receive beam over the at least a first one of the fields of regard;
causing the at least one first transmit beam to have a second transmit characteristic while steering the at least one first transmit beam over the at least a first other one of the fields of regard; and
causing the at least one first receive beam to have a second receive characteristic while steering the at least one first receive beam over the at least a first other one of the fields of regard.

17. The method of claim 16 wherein:
the first transmit characteristic includes a first transmit waveform;
the first receive characteristic includes a first receive waveform;
the second transmit characteristic includes a second transmit waveform; and
the second receive characteristic includes a second receive waveform.

18. The method of claim 11, further comprising:
radiating at least one second transmit beam;
forming at least one second receive beam; and
steering the at least one second transmit beam and the at least one second receive beam over the at least a first one and the at least a first other one of the fields of regard while steering the at least one first transmit beam and the at least one first receive beam over the at least a first one and the at least a first other one of the fields of regard.

19. A non-transitory computer-readable medium storing instructions that, when executed by at least one processing circuit, cause the at least one processing circuit, or another circuit under control of the at least one processing circuit:
to radiate, with an antenna, at least one first transmit beam;
to form at least one first receive beam;
to steer the at least one first transmit beam and the at least one first receive beam over fields of regard;
to receive, from at least one first receive beam, information related to the fields of regard;
to detect, from the information, a change related to at least one object within at least a first one of the fields of regard; and
to steer, in response to detecting the change, the at least one first transmit beam and the at least one first receive beam over the at least a first one of the fields of regard according to a first value of an update rate, and over the at least a first other one of the fields of regard according to a second value of the update rate, and
to steer the at least one first transmit beam and the at least one first receive beam over the at least a first one of the fields of regard according to a third value of the update rate a time after detecting the change.

20. The non-transitory computer-readable medium of claim 19 wherein the instructions, when executed by at least one processing circuit, further cause the at least one processing circuit, or another circuit under control of the at least one processing circuit to transition from steering the at least one first transmit beam and the at least one first receive beam over the at least a first one of the fields of regard to over the at least a first other one of the fields of regard in response to a command.

21. The non-transitory computer-readable medium of claim 19 wherein the instructions, when executed by at least one processing circuit, further cause the at least one processing circuit, or another circuit under control of the at least one processing circuit to transition from steering the at least one first transmit beam and the at least one first receive beam over the at least a first one of the fields of regard to over the at least a first other one of the fields of regard in response to an occurrence of an event.

22. The non-transitory computer-readable medium of claim 19 wherein the instructions, when executed by at least one processing circuit, further cause the at least one processing circuit, or another circuit under control of the at least one processing circuit to transition from steering the at least one first transmit beam and the at least one first receive beam over the at least a first one of the fields of regard to the at least a first other one of the fields of regard in response to an interrupt signal.

23. The non-transitory computer-readable medium of claim 19 wherein the instructions, when executed by at least one processing circuit, further cause the at least one processing circuit, or another circuit under control of the at least one processing circuit to transition from steering the at least one first transmit beam and the at least one first receive beam over the at least a first one of the fields of regard to the at least a first other one of the fields of regard in response to an elapse of an amount of time.

24. The non-transitory computer-readable medium of claim 19 wherein the instructions, when executed by at least one processing circuit, further cause the at least one processing circuit, or another circuit under control of the at least one processing circuit:
to cause the at least one first transmit beam to have a first transmit characteristic while the at least one first transmit beam is being steered over the at least a first one of the fields of regard;
to cause the at least one first receive beam to have a first receive characteristic while the at least one first receive beam is being steered over the at least a first one of the fields of regard;
to cause the at least one first transmit beam to have a second transmit characteristic while the at least one first transmit beam is being steered over the at least a first other one of the fields of regard; and to cause the at least one first receive beam to have a second receive characteristic while the at least one first receive beam is being steered over the at least a first other one of the fields of regard.

25. The non-transitory computer-readable medium of claim 19 wherein the instructions, when executed by at least one processing circuit, further cause the at least one processing circuit, or another circuit under control of the at least one processing circuit:
- to radiate at least one second transmit beam;
- to form at least one second receive beam; and
- to steer the at least one second transmit beam and the at least one second receive beam over the at least a first one of the fields of regard and the at least a first other one of the fields of regard while the at least one first transmit beam and the at least one first receive beam are being steered over the at least a first one of the fields of regard and the at least a first other one of the fields of regard.

26. The non-transitory computer-readable medium of claim 24 wherein:
- the first transmit characteristic includes a first transmit waveform;
- the first receive characteristic includes a first receive waveform;
- the second transmit characteristic includes a second transmit waveform; and
- the second receive characteristic includes a second receive waveform.

\* \* \* \* \*